United States Patent
Liu et al.

(10) Patent No.: US 10,942,621 B2
(45) Date of Patent: Mar. 9, 2021

(54) CHARACTER STRING DISPLAY METHOD AND TERMINAL DEVICE

(71) Applicant: Huawei Technologies Co., Ltd., Shenzhen (CN)

(72) Inventors: Anqi Liu, Shenzhen (CN); Hongjun Wang, Shenzhen (CN); Zhiyan Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/341,600

(22) PCT Filed: Oct. 12, 2016

(86) PCT No.: PCT/CN2016/101904
§ 371 (c)(1),
(2) Date: Apr. 12, 2019

(87) PCT Pub. No.: WO2018/068232
PCT Pub. Date: Apr. 19, 2018

(65) Prior Publication Data
US 2019/0324625 A1    Oct. 24, 2019

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 3/04847* (2013.01); *G09G 5/26* (2013.01); *G09G 5/30* (2013.01)

(58) Field of Classification Search
CPC .............. G06F 3/04817; G06F 3/0482; G06F 3/04842; G06F 3/04847
See application file for complete search history.

(56) References Cited

U.S. PATENT DOCUMENTS

2004/0268268 A1* 12/2004 Scheu ................... G06F 3/0482
715/835
2005/0055635 A1    3/2005 Bargeron et al.
(Continued)

FOREIGN PATENT DOCUMENTS

CN    102207870 A    10/2011
CN    103064578 A    4/2013
(Continued)

OTHER PUBLICATIONS

Machine Translation and Abstract of Chinese Publication No. CN102207870, Oct. 5, 2011, 12 pages.
(Continued)

*Primary Examiner* — Claudia Dragoescu
(74) *Attorney, Agent, or Firm* — Conley Rose, P.C.

(57) ABSTRACT

A character string display method and a terminal device, where the method includes processing, by a terminal device, at least two control regions based on control information to form at least two reset control regions satisfying a first target condition, where the first target condition includes that any two neighboring reset control regions in the at least two reset control regions in a landscape direction of the display are coupled, and displaying a character string in any one of the at least two reset control regions. Hence, a length of the reset control region is greater than a length of the control region, and a length of a character string displayed in the reset control region is greater than a length of a character string displayed in the control region.

20 Claims, 21 Drawing Sheets

(51) Int. Cl.
*G06F 3/0482* (2013.01)
*G06F 3/0484* (2013.01)
*G09G 5/26* (2006.01)
*G09G 5/30* (2006.01)

(56) References Cited

U.S. PATENT DOCUMENTS

| | | | |
|---|---|---|---|
| 2005/0108655 A1 | 5/2005 | Andrea et al. | |
| 2008/0059877 A1 | 3/2008 | Brookler et al. | |
| 2009/0189903 A1* | 7/2009 | Imai | G06F 3/14 345/467 |
| 2010/0146444 A1 | 6/2010 | Wang et al. | |
| 2011/0320938 A1* | 12/2011 | Schorsch | G06F 40/109 715/269 |
| 2014/0068497 A1* | 3/2014 | Park | G06F 40/274 715/780 |
| 2014/0372874 A1* | 12/2014 | Marseille | G06F 40/106 715/243 |
| 2015/0286379 A1 | 10/2015 | Ferry et al. | |

FOREIGN PATENT DOCUMENTS

| | | | |
|---|---|---|---|
| CN | 103473302 A | 12/2013 | |
| CN | 103699632 A | 4/2014 | |
| CN | 104133615 A | 11/2014 | |
| CN | 104184896 A | 12/2014 | |
| CN | 105389083 A | 3/2016 | |
| CN | 105608084 A | 5/2016 | |
| CN | 105824633 A | 8/2016 | |
| CN | 105975264 A | 9/2016 | |
| EP | 1206753 B1 | 10/2004 | |
| JP | H04278992 A | 10/1992 | |
| JP | H08331293 A | 12/1996 | |
| JP | H10222333 A | 8/1998 | |
| JP | 2007511851 A | 5/2007 | |
| JP | 2010160753 A | 7/2010 | |
| JP | 2014063439 A | 4/2014 | |
| JP | 2016163939 A | 9/2016 | |
| WO | 2001065351 A1 | 9/2001 | |
| WO | 2016101833 A1 | 6/2016 | |

OTHER PUBLICATIONS

Machine Translation and Abstract of Chinese Publication No. CN103064578, Apr. 24, 2013, 14 pages.
Machine Translation and Abstract of Chinese Publication No. CN105975264, Sep. 28, 2016, 24 pages.
Foreign Communication From a Counterpart Application, PCT Application No. PCT/CN2016/101904, English Translation of International Search Report dated Jul. 6, 2017, 2 pages.
Foreign Communication From a Counterpart Application, PCT Application No. PCT/CN2016/101904, English Translation of Written Opinion dated Jul. 6, 2017, 4 pages.
Machine Translation and Abstract of Chinese Publication No. CN103473302, Dec. 25, 2013, 17 pages.
Machine Translation and Abstract of Chinese Publication No. CN104133615, Nov. 5, 2014, 20 pages.
Machine Translation and Abstract of Chinese Publication No. CN104184896, Dec. 3, 2014, 5 pages.
Machine Translation and Abstract of Japanese Publication No. JPH04278992, Oct. 5, 1992, 7 pages.
Machine Translation and Abstract of International Publication No. WO2016101833, Jun. 30, 2016, 17 pages.
Foreign Communication From a Counterpart Application, European Application No. 16918644.2, Extended European Search Report dated Oct. 16, 2019, 8 pages.
Machine Translation and Abstract of Chinese Publication No. CN105389083, Mar. 9, 2016, 20 pages.
Machine Translation and Abstract of Chinese Publication No. CN105608084, May 25, 2016, 13 pages.
Foreign Communication From a Counterpart Application, Chinesse Application No. 201680075893.3, Chinese Office Action dated Nov. 28, 2019, 5 pages.

* cited by examiner

CHARACTER STRING DISPLAY METHOD AND TERMINAL DEVICE

CROSS-REFERENCE TO RELATED APPLICATIONS

This application is a U.S. National Stage of International Patent Application No. PCT/CN2016/101904 filed on Oct. 12, 2016, which is hereby incorporated by reference in its entirety.

TECHNICAL FIELD

The present invention relates to the field of text drawing processing, and in particular, to a character string display method applied to a terminal device, and a terminal device.

BACKGROUND

A plurality of control regions are displayed on a display screen of a terminal device, and a size of each control region is preset due to requirements such as interface drawing and text editing, so that a length of a character string output in the control region is less than or equal to a length of the control region. In addition, the control regions may be transparently displayed on the terminal device, so that the control regions are invisible to a user.

For example, as shown in FIG. 1, a display screen of a terminal device is divided into a plurality of control regions 100. Using any control region 100 as an example, an icon and a character string corresponding to the icon are disposed in the control region 100, and the icon can receive a touch event input by a user, so that the icon can make a corresponding function response to the touch event input by the user, for example, start an application corresponding to the icon. The character string corresponding to the icon may be a name corresponding to the icon. As can be learned from FIG. 1, the user can learn, by using the character string shown in the control region 100, that the icon displayed in the current control region can start an application of Tencent News. Using a control region 101 as another example, an icon and a character string PlayMemories Mobile corresponding to the icon are disposed in the control region 101. The PlayMemories Mobile is applied to professional image transmission application software of a smartphone and/or a tablet computer. Because when the character string PlayMemories Mobile is displayed in one line, a length of the character string exceeds a length of the control region 101, the character string displayed in the control region 101 is displayed in a line breaking manner, and a display effect is shown in FIG. 1.

As can be learned, in the prior art, a character string whose length is greater than a length of a control region is displayed in a line breaking manner, and the character string displayed in the line breaking manner reduces reading efficiency of a user. As a result, efficiency of operating, by the user, a terminal device is reduced.

SUMMARY

Embodiments of the present invention provide a character string display method and a terminal device that can effectively reduce a quantity of times of breaking a character string displayed on a display screen of a terminal device and improve efficiency of reading, by a user, a character string.

A first aspect of the embodiments of the present invention provides a character string display method, including the following steps.

Step A0. Detect whether a sub-region displayed on the terminal device satisfies a preset condition, and if the sub-region satisfies the preset condition, perform step B.

Specifically, the terminal device may preset a preset coordinate range, and each preset coordinate range corresponds to each control region, so that the control region is displayed in the preset coordinate range corresponding to the control region. As can be learned, in this embodiment, the terminal device sets a display location and a display range of the control region on the display screen by using the preset coordinate range.

Specifically, the control region provided in this embodiment includes a character string used to be displayed on the display screen of the terminal device.

Optionally, the control region may include an icon and/or a virtual button configured to respond to an operation event input by a user.

In this embodiment, the display screen of the terminal device is divided into at least one sub-region in a landscape direction of the terminal device, and at least one control region is disposed in each sub-region.

A first preset gap is disposed between any two neighboring control regions in a same sub-region.

In this embodiment, the preset condition is: the sub-region includes at least one target control region.

A length of a character string included in the target control region is greater than a length of the target control region.

Specifically, if the terminal device determines that a length of a character string in any one of a plurality of control regions included in the sub-region is less than or equal to a length of the control region, the terminal device generates control information, and continues to perform step B.

Alternatively, the terminal device performs step A1 before performing step B.

Step A1. Receive an operation that is input by a user and used to generate the control information.

Specifically, when the user resets a language of the terminal device, for example, in this embodiment, the user sets the language of the terminal device from Chinese to English, the terminal device may display an operation interface on the display screen, where the operation interface may indicate whether the user needs to set a control region to form the reset control region. If the user notifies the terminal device by using the operation interface that the control region needs to be set to form the reset control region, the terminal device may generate the control information based on an operation of the user, where the control information is used to trigger the terminal device to perform step B.

Step B. Receive the control information.

In this embodiment, the control information is used to instruct the terminal device to process the control region to form the reset control region satisfying a first target condition, and the first target condition is: any two neighboring reset control regions in the at least two reset control regions in the landscape direction of the display screen are connected, that is, no first gap is disposed between two neighboring reset control regions.

Step C. Display the reset control region on the display screen.

Specifically, after receiving the control information, the terminal device may display the at least two reset control regions on the display screen based on the control information.

Specifically, a target sub-region is a sub-region satisfying the preset condition.

A length of the reset control region is a reset length.

Specifically, a plurality of control regions included in the target sub-region include at least one target control region.

Specifically, a process of resetting the target sub-region is:

obtaining a length L of the target sub-region in the landscape direction of the terminal device;

obtaining a quantity N of the control regions included in the target sub-region; and determining that a reset length of each reset control region is L/N.

In this embodiment, the length of the target sub-region is not modified, so that a length obtained after the target sub-region is reset is the same as a length obtained before the target sub-region is reset.

The terminal device obtains the length L of the target sub-region in the landscape direction of the terminal device;

obtains the quantity N of the control regions included in the target sub-region; and determines that the reset length of each reset control region is L/N.

The following two conditions are satisfied after the target sub-region is reset:

Condition 1: Before the target sub-region is reset, the first preset gap is disposed between any two neighboring control regions in the target sub-region, and after the target sub-region is reset, no first preset gap is disposed between any two neighboring reset control regions in the target sub-region. That is, any two neighboring reset control regions in the target sub-region abut against each other, and in a display effect, boundaries of any two neighboring reset control regions in the target sub-region overlap with each other.

Condition 2: Reset control regions are disposed in the target sub-region and on two sides of the target sub-region, a second preset gap is disposed between one of the reset control regions and an edge of the display screen of the terminal device, and the second preset gap is disposed between the other one of the reset control regions and an edge of the display screen. A size of the second preset gap is not limited in this embodiment.

Step D. Display a character string in the reset control region.

In this embodiment, because the control region is processed to form the reset control region, and in the landscape direction of the display screen, the length of the reset control region is greater than the length of the control region, a length of a character string that can be displayed in the reset control region is greater than a length of a character string that can be displayed in the control region. Therefore, in this embodiment, a character string is displayed in the reset control region, so that a quantity of lines of a character string displayed in a control region can be reduced effectively, thereby improving efficiency of reading, by a user, a character string displayed in a reset control region.

With reference to the first aspect of the embodiments of the present invention, in a first implementation of the first aspect of the embodiments of the present invention, step D includes the following steps.

Step D11. Determine a first target reset control region.

In this embodiment, a second target reset control region is disposed on each of two sides of the first target reset control region, a length of a first character string included in the first target reset control region is greater than a length of the first target reset control region, and a length of a second character string included in the second target reset control region is greater than a length of the second target reset control region.

Step D12. Perform target processing on the first character string.

The target processing is: shrinking any character in the first character string included in the first target reset control region, so that the shrunk any character in the first character string is greater than or equal to a first preset value.

The first preset value is not limited in this embodiment provided that the user can clearly view the character greater than or equal to the first preset value.

Step D13. Display, in the first target reset control region in a display manner of at least one line of character string, the first character string on which the target processing has been performed.

According to step D13 in this embodiment, any line of the at least one line of character string of the first character string satisfies a second target condition.

The second target condition is: a length of any line of the at least one line of character string of the first character string on which the target processing has been performed is less than or equal to a reset length of the first target reset control region, and a gap between any line of the at least one line of character string of the first character string and the second character string is greater than or equal to a second preset value.

As can be learned from the method in this embodiment, when the second target reset control region is disposed on each of the two sides of the first target reset control region, the length of the first character string included in the first target reset control region is greater than the length of the first target reset control region, and the length of the second character string included in the second target reset control region is greater than the length of the second target reset control region, in this embodiment, the target processing can be performed on the first character string, so that any line of the at least one line of character string of the first character string satisfies the second target condition.

Optionally, if the length of the first character string on which the target processing has been performed is less than or equal to the length of the reset control region, the first character string on which the target processing has been performed is displayed in the reset control region in a centered manner.

Further optionally, if the length of the first character string on which the target processing has been performed is greater than the length of the reset control region, the first character string on which the target processing has been performed is displayed in the reset control region in a line breaking manner.

Further optionally, if the terminal device determines that characters in the reset control region cannot be displayed in the reset control region in a single line even after being shrunk, the terminal device may not shrink the characters in the reset control region, but directly displays the characters in a line breaking manner.

In the method in this embodiment, because a length of a control region in the prior art is extended, a reset control region in this embodiment can display a longer character string. In addition, when reset control regions on left and right sides of a reset control region both satisfy the first condition, a character string in the reset control region may be shrunk. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the first aspect of the embodiments of the present invention, in a second implementation of the first aspect of the embodiments of the present invention, step D includes the following steps.

Step D21. Determine a first target reset control region.

In this embodiment, a length of a first character string included in the first target reset control region is greater than a length of the first target reset control region, a length of a second character string in a second target reset control region located on a first side of the first target reset control region is less than a second length, the second length is a reset length of the second target reset control region located on the first side of the first target reset control region, a length of a third character string in a second target reset control region located on a second side of the first target reset control region is greater than a third length, and the third length is a reset length of the second target reset control region located on the second side of the first target reset control region.

Step D22. Determine a single-line display region of the first character string.

The single-line display region of the first character string is disposed by extending the first target reset control region towards the second character string, so that a length of the single-line display region of the first character string is greater than a reset length of the first target reset control region, and a gap between the single-line display region of the first character string and the second character string is greater than or equal to a second preset value.

Step D23. Display the first character string in the single-line display region of the first character string in a display manner of at least one line of character string.

In the method in this embodiment, a length of any line of the at least one line of character string of the first character string can be less than or equal to a reset length of the single-line display region of the first character string.

Specifically, the first target reset control region may include a region used for displaying an icon and a region used for displaying a character string. When the length of the first character string is greater than the length of the first target reset control region, both regions in the first target reset control region may be extended towards the second character string until a distance between the single-line display region of the first character string and the second character string is greater than or equal to the second preset value, or the region used for displaying a character string in the first target reset control region may be extended towards the second character string until a distance between the region used for displaying a character string in the single-line display region of the first character string and the second character string is greater than or equal to the second preset value.

Specifically, in the process of extending the single-line display region of the first character string towards the second character string, if the length of the single-line display region of the first character string is greater than or equal to a length of a single line of displaying the first character string, the single-line display region of the first character string is no longer extended.

In the process of extending the single-line display region of the first character string towards the second character string, if the distance between the single-line display region of the first character string and the second character string is equal to the second preset value, and/or the length of the single-line display region of the first character string is greater than or equal to the length of the single line of displaying the first character string, the single-line display region of the first character string is no longer extended towards the second character string.

A specific process of displaying the first character string in this embodiment is:

determining whether the length of the first character string is less than or equal to the length of the single-line display region of the first character string; and if the length of the first character string is less than or equal to the length of the single-line display region of the first character string, displaying the first character string in the single-line display region of the first character string in a manner of a single line; or if the length of the first character string is greater than the length of the single-line display region of the first character string, displaying the first character string in the single-line display region of the first character string in a line breaking manner.

As can be learned from this case, because a length of a control region in the prior art is extended, a reset control region in this embodiment can display a longer character string, and when one side of the first target reset control region satisfies a first condition, and the other side of the first target reset control region satisfies a second condition, where the first condition is: a length of a character string in the reset control region is greater than a reset length of the reset control region, and the second condition is: a length of a character string in the reset control region is less than a reset length of the reset control region, the first character string in the first target reset control region can be extended towards a second character string in a reset control region satisfying the second condition, and it is ensured that a distance between the first character string and the second character string is greater than or equal to the second preset value. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the first aspect of the embodiments of the present invention, in a third implementation of the first aspect of the embodiments of the present invention, step D includes the following steps.

Step D31. Determine a first target reset control region.

A length of a first character string included in the first target reset control region is greater than a length of the first target reset control region, a length of a second character string in a second target reset control region located on a first side of the first target reset control region is less than a second length, the second length is a reset length of the second target reset control region located on the first side of the first target reset control region, a length of a third character string in a second target reset control region located on a second side of the first target reset control region is less than a third length, and the third length is a reset length of the second target reset control region located on the second side of the first target reset control region.

Step D32. Determine a single-line display region of the first character string.

The single-line display region of the first character string is disposed by extending the first target reset control region towards the second character string and the third character string, so that a length of the single-line display region of the first character string is greater than a reset length of the first target reset control region, and a gap between the single-line display region of the first character string and the second character string and a gap between the single-line display region of the first character string and the third character string both are greater than or equal to a second preset value.

Step D33. Display the first character string in the single-line display region of the first character string in a display manner of at least one line of character string.

In the method in this embodiment, a length of any line of the at least one line of character string of the first character string can be less than or equal to the length of the single-line display region of the first character string.

In this embodiment, the first character string can separately move in the reset control region towards the second character string and the third character string after center alignment.

In this embodiment, a specific process of extending the single-line display region of the first character string may be as follows.

Specifically, in the process of extending the single-line display region of the first character string evenly towards the two sides, if the length of the single-line display region of the first character string is greater than or equal to a length of a single line of displaying the first character string, the single-line display region of the first character string is no longer extended towards the two sides.

In the process of extending the single-line display region of the first character string towards the second character string and the third character string, if a distance between the single-line display region of the first character string and the second character string is equal to the second preset value, and a distance between the single-line display region of the first character string and the third character string is greater than the second preset value, the single-line display region of the first character string is no longer extended towards the second character string, but is extended towards the third character string until the length of the single-line display region of the first character string is greater than or equal to the length of the single line of displaying the first character string and/or the distance between the single-line display region 805 of the first character string and the third character string is equal to the second preset value.

In the process of extending the single-line display region of the first character string towards the second character string and the third character string, if a distance between the single-line display region of the first character string and the third character string is equal to the second preset value, and a distance between the single-line display region of the first character string and the second character string is greater than the second preset value, the single-line display region of the first character string is no longer extended towards the third character string, but is extended towards the second character string until the length of the single-line display region of the first character string is greater than or equal to the length of the single line of displaying the first character string and/or the distance between the single-line display region of the first character string and the second character string is equal to the second preset value.

A specific process of displaying the first character string in this embodiment is:

determining whether the length of the first character string is less than or equal to the length of the single-line display region of the first character string; and if the length of the first character string is less than or equal to the length of the single-line display region of the first character string, displaying the first character string in the single-line display region of the first character string in a manner of a single line; or if the length of the first character string is greater than the length of the single-line display region of the first character string, displaying the first character string in the single-line display region of the first character string in a line breaking manner.

As can be learned from this case, because a length of a control region in the prior art is extended, the first target reset control region in this embodiment can display a longer character string, and when reset control regions on two sides of a first target reset control region located at a first location both satisfy the second condition, a first character string in the first target reset control region can be extended towards a second character string and the third character string in the reset control regions satisfying the second condition, and it is ensured that a distance between the first character string and the second character string is greater than or equal to the second preset value and a distance between the first character string and the third character string is greater than or equal to the second preset value. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the second implementation of the first aspect of the embodiments of the present invention or the third implementation of the first aspect of the embodiments of the present invention, in a fourth implementation of the first aspect of the embodiments of the present invention, step D further includes the following steps.

Step D41. Perform target processing on the first character string.

The target processing is: shrinking a character string, and enabling the shrunk character string to be greater than or equal to a first preset value.

Step D42. Display, in the single-line display region of the first character string in the display manner of at least one line of character string, the first character string on which the target processing has been performed.

In this embodiment, the first character string in the first target reset control region can be shrunk, so that a quantity of characters that can be displayed in the first target reset control region in a single line is increased, and line breaking of the first character string displayed in the first target reset control region is further avoided or a quantity of lines of the first character string displayed in the first target reset control region is further reduced, thereby reducing a quantity of times of breaking a character string, and improving efficiency of reading, by a user, a character string.

With reference to the first aspect of the embodiments of the present invention, in a fifth implementation of the first aspect of the embodiments of the present invention, step D includes the following steps.

Step D51. Determine a fourth target reset control region.

A length of a fourth character string included in the fourth target reset control region is greater than a length of the fourth target reset control region, the fourth target reset control region is located between an edge of the display screen and a fifth target reset control region, and a length of a fifth character string included in the fifth target reset control region is greater than a length of the fifth target reset control region.

Step D52. Determine a single-line display region of the fourth character string.

The single-line display region of the fourth character string is disposed by extending the fourth target reset control region towards the edge of the display screen, so that a length of the single-line display region of the fourth character string is greater than a reset length of the fourth target reset control region, and a gap between the single-line display region of the fourth character string and the edge of the display screen is greater than or equal to a third preset value.

Step D53. Display the fourth character string in the single-line display region of the fourth character string in a display manner of at least one line of character string.

In the method in this embodiment, a length of any line of the at least one line of character string of the fourth character string can be less than or equal to the length of the single-line display region of the fourth character string.

As can be learned from this case, because a length of a control region in the prior art is extended, a reset control region in this embodiment can display a longer character string, and the fourth character string in this embodiment can be extended towards the edge of the display screen, so that a length of a character string that can be displayed in the fourth target reset control region is further increased, that is, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the first aspect of the embodiments of the present invention, in a sixth implementation of the first aspect of the embodiments of the present invention, step D includes the following steps.

Step D61. Determine a fourth target reset control region.

A length of a fourth character string included in the fourth target reset control region is greater than a length of the fourth target reset control region, the fourth target reset control region is located between an edge of the display screen and a fifth target reset control region, and a length of a fifth character string included in the fifth target reset control region is less than a length of the fifth target reset control region.

Step D62. Determine a single-line display region of the fourth character string.

The single-line display region of the fourth character string is disposed by extending the fourth target reset control region towards the edge of the display screen and the fifth character string, so that a length of the single-line display region of the fourth character string is greater than a reset length of the fourth target reset control region, a gap between the single-line display region of the fourth character string and the edge of the display screen is greater than or equal to a third preset value, and a gap between the fourth character string and the fifth character string is greater than or equal to a second preset value.

Step D63. Display the fourth character string in the single-line display region of the fourth character string in a display manner of at least one line of character string.

In the method in this embodiment, a length of any line of the at least one line of character string of the fourth character string can be less than or equal to the length of the single-line display region of the fourth character string.

As can be learned from this case, because a length of a control region in the prior art is extended, a reset control region in this embodiment can display a longer character string, and the fourth character string in this embodiment can be extended towards the edge of the display screen and the fifth character string, so that a length of a character string that can be displayed in the fourth target reset control region is further increased, that is, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the fifth implementation of the first aspect of the embodiments of the present invention or the sixth implementation of the first aspect of the embodiments of the present invention, in a seventh implementation of the first aspect of the embodiments of the present invention, step D includes the following steps.

Step D71. Perform target processing on the fourth character string.

The target processing is: shrinking a character string, and enabling the shrunk character string to be greater than or equal to a first preset value.

Step D72. Display, in the fourth target reset control region in a display manner of at least one line of character string, the fourth character string on which the target processing has been performed.

In the method in this embodiment, a length of any line of the at least one line of character string of the fourth character string is less than or equal to the reset length of the fourth target reset control region.

In this embodiment, the fourth character string in the fourth target reset control region can be shrunk, so that a quantity of characters that can be displayed in the fourth target reset control region in a single line is increased, and line breaking of the fourth character string displayed in the fourth target reset control region is further avoided or a quantity of lines of the fourth character string displayed in the fourth target reset control region is further reduced, thereby reducing a quantity of times of breaking a character string, and improving efficiency of reading, by a user, a character string.

A second aspect of the embodiments of the present invention provides a terminal device, including a receiving unit, a first display unit, and a second display unit.

The receiving unit is configured to receive control information, where the control information is used to instruct the terminal device to process at least two control regions, to form at least two reset control regions satisfying a first target condition, a first gap is disposed between any two neighboring control regions in the at least two control regions in a landscape direction of a display screen, and the first target condition is: any two neighboring reset control regions in the at least two reset control regions in the landscape direction of the display screen are connected.

It should be clarified that the receiving unit provided in this embodiment is configured to perform step A0 or step A1 in the first aspect of the embodiments of the present invention, and is configured to perform step B.

For a specific process of performing step A0 or step A1, and performing step B, refer to the first aspect of the embodiments of the present invention, and details are not described in this embodiment again.

The first display unit is configured to display the at least two reset control regions on the display screen based on the control information.

The first display unit in this embodiment is configured to perform step C in the first aspect of the embodiments of the present invention. For a specific process of performing step C, refer to the first aspect of the embodiments of the present invention, and details are not described in this embodiment of the present invention again.

The second display unit is configured to display a character string in any one of the at least two reset control regions.

The second display unit in this embodiment is configured to perform step D in the first aspect of the embodiments of the present invention. For a specific process of performing step D, refer to the first aspect of the embodiments of the present invention, and details are not described in this embodiment of the present invention again.

In this embodiment, because the control region is processed to form the reset control region, and in the landscape direction of the display screen, the length of the reset control region is greater than the length of the control region, a length of a character string that can be displayed in the reset control region is greater than a length of a character string that can be displayed in the control region. Therefore, in this embodiment, a character string is displayed in the reset control region, so that a quantity of lines of a character string displayed in a control region can be reduced effectively, thereby improving efficiency of reading, by a user, a character string displayed in a reset control region.

With reference to the second aspect of the embodiments of the present invention, in a first implementation of the second aspect of the embodiments of the present invention, the second display unit includes a first determining module and a first display module.

The first determining module is configured to determine at least one first target reset control region included in the at least two reset control regions, where a second target reset control region is disposed on each of two sides of the first target reset control region, a length of a first character string included in the first target reset control region is greater than a length of the first target reset control region, and a length of a second character string included in the second target reset control region is greater than a length of the second target reset control region.

The first determining module in this embodiment is configured to perform step D11 in the first implementation of the first aspect of the embodiments of the present invention. For a specific process of performing step D11, refer to the first aspect of the embodiments of the present invention, and details are not described in this embodiment of the present invention again.

The first display module is configured to display, in the first target reset control region in a display manner of at least one line of character string, the first character string on which target processing has been performed, so that any line of the at least one line of character string of the first character string satisfies a second target condition, where the target processing is: shrinking a character string, and enabling the shrunk character string to be greater than or equal to a first preset value, and the second target condition is: a length of any line of the at least one line of character string of the first character string on which the target processing has been performed is less than or equal to a reset length of the first target reset control region, and a gap between any line of the at least one line of character string of the first character string and the second character string is greater than or equal to a second preset value.

The first determining module in this embodiment is configured to perform step D12 and step D13 in the first implementation of the first aspect of the embodiments of the present invention. For a specific process of performing step D12 and step D13, refer to the first aspect of the embodiments of the present invention, and details are not described in this embodiment of the present invention again.

In the terminal device in this embodiment, because a length of a control region in the prior art is extended, a reset control region in this embodiment can display a longer character string. In addition, when reset control regions on left and right sides of a reset control region both satisfy the first condition, a character string in the reset control region may be shrunk. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the second aspect of the embodiments of the present invention, in a second implementation of the second aspect of the embodiments of the present invention, the second display unit includes a second determining module, a third determining module, and a second display module.

The second determining module is configured to determine at least one first target reset control region included in the at least two reset control regions, where a length of a first character string included in the first target reset control region is greater than a length of the first target reset control region, a length of a second character string in a second target reset control region located on a first side of the first target reset control region is less than a second length, the second length is a reset length of the second target reset control region located on the first side of the first target reset control region, a length of a third character string in a second target reset control region located on a second side of the first target reset control region is greater than a third length, and the third length is a reset length of the second target reset control region located on the second side of the first target reset control region.

The second determining module in this embodiment is configured to perform step D21 in the second implementation of the first aspect of the embodiments of the present invention. For a specific process of performing step D21, refer to the second implementation of the first aspect of the embodiments of the present invention, and details are not described in this embodiment of the present invention again.

The third determining module is configured to determine a single-line display region of the first character string, where the single-line display region of the first character string is disposed by extending the first target reset control region towards the second character string, so that a length of the single-line display region of the first character string is greater than a reset length of the first target reset control region, and a gap between the single-line display region of the first character string and the second character string is greater than or equal to a second preset value.

The third determining module in this embodiment is configured to perform step D31 in the second implementation of the first aspect of the embodiments of the present invention. For a specific process of performing step D31, refer to the second implementation of the first aspect of the embodiments of the present invention, and details are not described in this embodiment of the present invention again.

The second display module is configured to display the first character string in the single-line display region of the first character string in a display manner of at least one line of character string, so that a length of any line of the at least one line of character string of the first character string is less than or equal to a reset length of the single-line display region of the first character string.

The second display module in this embodiment is configured to perform step D23 in the second implementation of the first aspect of the embodiments of the present invention. For a specific process of performing step D23, refer to the second implementation of the first aspect of the embodiments of the present invention, and details are not described in this embodiment of the present invention again.

As can be learned from this case, because a length of a control region in the prior art is extended, a reset control region in this embodiment can display a longer character string, and when one side of the first target reset control region satisfies a first condition, and the other side of the first target reset control region satisfies a second condition, where the first condition is: a length of a character string in the reset control region is greater than a reset length of the reset control region, and the second condition is: a length of a character string in the reset control region is less than a reset length of the reset control region, the first character string in the first target reset control region can be extended towards a second character string in a reset control region satisfying the second condition, and it is ensured that a distance between the first character string and the second character string is greater than or equal to the second preset value. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the second aspect of the embodiments of the present invention, in a third implementation of the second aspect of the embodiments of the present invention, the second display unit includes a fourth determining module, a fifth determining module, and a third display module.

The fourth determining module is configured to determine at least one first target reset control region included in the at least two reset control regions, where a length of a first character string included in the first target reset control region is greater than a length of the first target reset control region, a length of a second character string in a second target reset control region located on a first side of the first target reset control region is less than a second length, the second length is a reset length of the second target reset control region located on the first side of the first target reset control region, a length of a third character string in a second target reset control region located on a second side of the first target reset control region is less than a third length, and the third length is a reset length of the second target reset control region located on the second side of the first target reset control region.

The fourth determining module in this embodiment is configured to perform step D31 in the third implementation of the first aspect of the embodiments of the present invention. For a specific process of performing step D31, refer to the third implementation of the first aspect of the embodiments of the present invention, and details are not described in this embodiment of the present invention again.

The fifth determining module is configured to determine a single-line display region of the first character string, where the single-line display region of the first character string is disposed by extending the first target reset control region towards the second character string and the third character string, so that a length of the single-line display region of the first character string is greater than a reset length of the first target reset control region, and a gap between the single-line display region of the first character string and the second character string and a gap between the single-line display region of the first character string and the third character string both are greater than or equal to a second preset value.

The fourth determining module in this embodiment is configured to perform step D32 in the third implementation of the first aspect of the embodiments of the present invention. For a specific process of performing step D32, refer to the third implementation of the first aspect of the embodiments of the present invention, and details are not described in this embodiment of the present invention again.

The third display module is configured to display the first character string in the single-line display region of the first character string in a display manner of at least one line of character string, so that a length of any line of the at least one line of character string of the first character string is less than or equal to the length of the single-line display region of the first character string.

The fourth determining module in this embodiment is configured to perform step D33 in the third implementation of the first aspect of the embodiments of the present invention. For a specific process of performing step D33, refer to the third implementation of the first aspect of the embodiments of the present invention, and details are not described in this embodiment of the present invention again.

As can be learned from this case, because a length of a control region in the prior art is extended, the first target reset control region in this embodiment can display a longer character string, and when reset control regions on two sides of a first target reset control region located at a first location both satisfy the second condition, a first character string in the first target reset control region can be extended towards a second character string and the third character string in the reset control regions satisfying the second condition, and it is ensured that a distance between the first character string and the second character string is greater than or equal to the second preset value and a distance between the first character string and the third character string is greater than or equal to the second preset value. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the second implementation of the second aspect of the embodiments of the present invention or the third implementation of the second aspect of the embodiments of the present invention, in a fourth implementation of the second aspect of the embodiments of the present invention, the second display unit includes:

a fourth display module, configured to display, in the single-line display region of the first character string in the display manner of at least one line of character string, the first character string on which target processing has been performed, where the target processing is: shrinking a character string, and enabling the shrunk character string to be greater than or equal to a first preset value.

The fourth display module in this embodiment is configured to perform step D41 and step D42 in the fourth implementation of the first aspect of the embodiments of the present invention. For a specific process of performing step D41 and step D42, refer to the fourth implementation of the first aspect of the embodiments of the present invention, and details are not described in this embodiment of the present invention again.

With reference to the second aspect of the embodiments of the present invention, in a fifth implementation of the second aspect of the embodiments of the present invention, the second display unit includes a sixth determining module, a seventh determining module, and a fifth display module.

The sixth determining module is configured to determine at least one fourth target reset control region included in the at least two reset control regions, where a length of a fourth character string included in the fourth target reset control region is greater than a length of the fourth target reset control region, the fourth target reset control region is located between an edge of the display screen and a fifth target reset control region, and a length of a fifth character string included in the fifth target reset control region is greater than a length of the fifth target reset control region.

The sixth determining module in this embodiment is configured to perform step D51 in the fifth implementation of the first aspect of the embodiments of the present invention. For a specific process of performing step D51, refer to the fifth implementation of the first aspect of the embodiments of the present invention, and details are not described in this embodiment of the present invention again.

The seventh determining module is configured to determine a single-line display region of the fourth character string, where the single-line display region of the fourth character string is disposed by extending the fourth target reset control region towards the edge of the display screen, so that a length of the single-line display region of the fourth character string is greater than a reset length of the fourth target reset control region, and a gap between the single-line display region of the fourth character string and the edge of the display screen is greater than or equal to a third preset value.

The sixth determining module in this embodiment is configured to perform step D52 in the fifth implementation of the first aspect of the embodiments of the present invention. For a specific process of performing step D52, refer to the fifth implementation of the first aspect of the embodiments of the present invention, and details are not described in this embodiment of the present invention again.

The fifth display module is configured to display the fourth character string in the single-line display region of the fourth character string in a display manner of at least one line of character string, so that a length of any line of the at least one line of character string of the fourth character string is less than or equal to a length of the single-line display region of the fourth character string.

The sixth determining module in this embodiment is configured to perform step D53 in the fifth implementation of the first aspect of the embodiments of the present invention. For a specific process of performing step D53, refer to the fifth implementation of the first aspect of the embodiments of the present invention, and details are not described in this embodiment of the present invention again.

As can be learned from this case, because a length of a control region in the prior art is extended, a reset control region in this embodiment can display a longer character string, and the fourth character string in this embodiment can be extended towards the edge of the display screen, so that a length of a character string that can be displayed in the fourth target reset control region is further increased, that is, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the second aspect of the embodiments of the present invention, in a sixth implementation of the second aspect of the embodiments of the present invention, the second display unit includes an eighth determining module, a ninth determining module, and a sixth display module.

The eighth determining module is configured to determine at least one fourth target reset control region included in the at least two reset control regions, where a length of a fourth character string included in the fourth target reset control region is greater than a length of the fourth target reset control region, the fourth target reset control region is located between an edge of the display screen and a fifth target reset control region, and a length of a fifth character string included in the fifth target reset control region is less than a length of the fifth target reset control region.

The eighth determining module in this embodiment is configured to perform step D61 in the sixth implementation of the first aspect of the embodiments of the present invention. For a specific process of performing step D61, refer to the sixth implementation of the first aspect of the embodiments of the present invention, and details are not described in this embodiment of the present invention again.

The ninth determining module is configured to determine a single-line display region of the fourth character string, where the single-line display region of the fourth character string is disposed by extending the fourth target reset control region towards the edge of the display screen and the fifth character string, so that a length of the single-line display region of the fourth character string is greater than a reset length of the fourth target reset control region, a gap between the single-line display region of the fourth character string and the edge of the display screen is greater than or equal to a third preset value, and a gap between the fourth character string and the fifth character string is greater than or equal to a second preset value.

The ninth determining module in this embodiment is configured to perform step D62 in the sixth implementation of the first aspect of the embodiments of the present invention. For a specific process of performing step D62, refer to the sixth implementation of the first aspect of the embodiments of the present invention, and details are not described in this embodiment of the present invention again.

The sixth display module is configured to display the fourth character string in the single-line display region of the fourth character string in a display manner of at least one line of character string, so that a length of any line of the at least one line of character string of the fourth character string is less than or equal to the length of the single-line display region of the fourth character string.

The sixth display module in this embodiment is configured to perform step D63 in the sixth implementation of the first aspect of the embodiments of the present invention. For a specific process of performing step D63, refer to the sixth implementation of the first aspect of the embodiments of the present invention, and details are not described in this embodiment of the present invention again.

As can be learned from this case, because a length of a control region in the prior art is extended, a reset control region in this embodiment can display a longer character string, and the fourth character string in this embodiment can be extended towards the edge of the display screen and the fifth character string, so that a length of a character string that can be displayed in the fourth target reset control region is further increased, that is, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

With reference to the fifth implementation of the second aspect of the embodiments of the present invention or the sixth implementation of the second aspect of the embodiments of the present invention, in a seventh implementation of the second aspect of the embodiments of the present invention, the second display unit includes:

a seventh display module, configured to display, in the fourth target reset control region in the display manner of at least one line of character string, the fourth character string on which target processing has been performed, so that a length of any line of the at least one line of character string of the fourth character string is less than or equal to the reset length of the fourth target reset control region, where the target processing is: shrinking a character string, and enabling the shrunk character string to be greater than or equal to a first preset value.

The seventh display module in this embodiment is configured to perform step D71 and step D72 in the seventh implementation of the first aspect of the embodiments of the present invention. For a specific process of performing step D71 and step D72, refer to the seventh implementation of the first aspect of the embodiments of the present invention, and details are not described in this embodiment of the present invention again.

In this embodiment, the fourth character string in the fourth target reset control region can be shrunk, so that a quantity of characters that can be displayed in the fourth target reset control region in a single line is increased, and line breaking of the fourth character string displayed in the fourth target reset control region is further avoided or a quantity of lines of the fourth character string displayed in the fourth target reset control region is further reduced, thereby reducing a quantity of times of breaking a character string, and improving efficiency of reading, by a user, a character string.

A third aspect of the embodiments of the present invention provides a terminal device, including:

one or more processors, a memory, a bus system, and one or more programs, where the processor and the memory are connected by using the bus system; and the one or more programs are stored in the memory, the one or more programs include an instruction, and when the instruction is executed by the terminal device, the terminal device performs the method described in any one of the first aspect of the embodiments of the present invention, or the first implementation to the seventh implementation of the first aspect of the embodiments of the present invention.

A fourth aspect of the embodiments of the present invention provides a computer-readable storage medium storing one or more programs, where the one or more programs include an instruction, and when the instruction is executed by a terminal device, the terminal device performs the method described in any one of the first aspect of the embodiments of the present invention, or the first implementation to the seventh implementation of the first aspect of the embodiments of the present invention.

In the character string display method and the terminal device that are provided in the embodiments of the present invention, a control region is processed by using the method in the embodiments, to form a reset control region, and a length of the reset control region is greater than a length of the control region in the landscape direction of the display screen, so that a length of a character string that can be displayed in the reset control region is greater than a length of a character string that can be displayed in the control region. Therefore, in the embodiments, a character string is displayed in the reset control region, so that a quantity of lines of a character string displayed in a control region can be reduced effectively, thereby improving efficiency of reading, by a user, a character string displayed in a reset control region.

DESCRIPTION OF EMBODIMENTS

Embodiments of the present invention provide a character string display method based on a terminal device. The following describes, with reference to FIG. 2, a specific structure of a terminal device that can implement the character string display method in the embodiments of the present invention.

Figure 2:
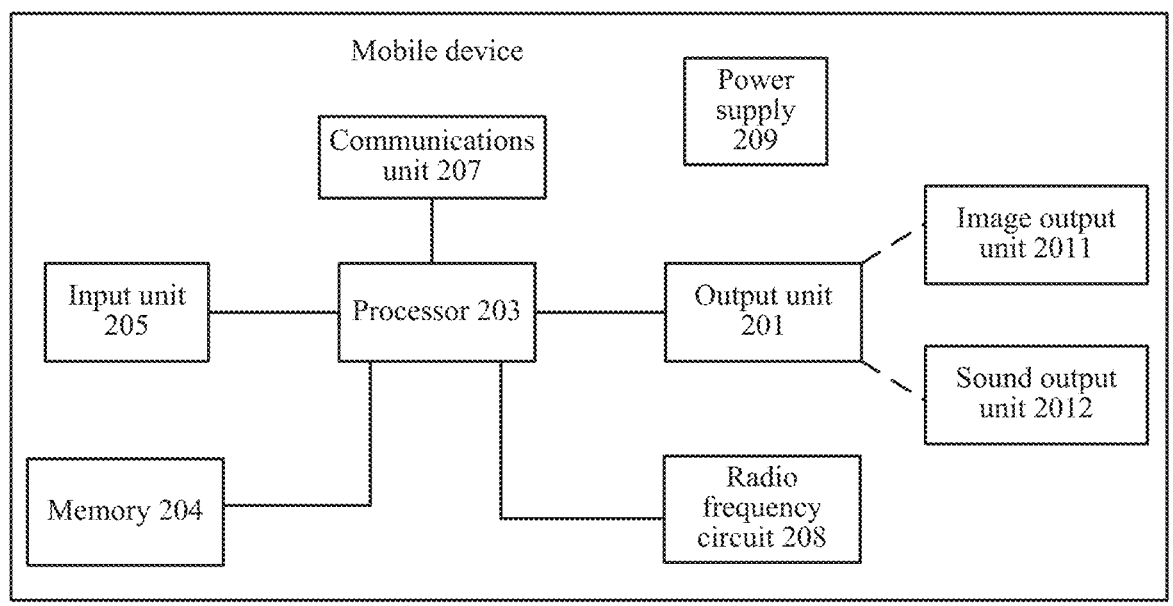
FIG. 2 is a schematic structural diagram of an embodiment of a terminal device according to the present invention.

The following describes the specific structure of the terminal device in the embodiments with reference to FIG. 2. FIG. 2 is a schematic structural diagram of an embodiment of a terminal device according to the present invention.

The terminal device includes components such as an input unit 205, a processor 203, an output unit 201, a communications unit 207, a memory 204, and a radio frequency circuit 208.

These components perform communication by using one or more buses. Persons skilled in the art may understand that the structure of the terminal device shown in FIG. 2 does not constitute a limitation to the present invention and may be a bus-form structure or a star-form structure, and the terminal device may further include more components or fewer components than those shown in the figure, or some components may be combined, or a different component layout may be used.

In an implementation of the present invention, the terminal device may be any mobile or portable electronic device, including but not limited to: a smartphone, a mobile computer, a tablet computer, a personal digital assistant (Personal Digital Assistant, PDA), and a media player.

The terminal device includes the following components.

The output unit 201 is configured to output a to-be-displayed image.

Specifically, the output unit 201 includes but is not limited to an image output unit 2011 and a sound output unit 2012.

The image output unit 2011 is configured to output text, pictures, and/or videos. The image output unit 2011 may include a display panel, for example, a display panel configured in a form of a liquid crystal display (English full name: Liquid Crystal Display, English acronym: LCD), an organic light-emitting diode (English full name: Organic Light-Emitting Diode, English acronym: OLED), or a field emission display (English full name: field emission display, English acronym: FED). Alternatively, the image output unit 2011 may include a reflective display, for example, an electrophoretic (electrophoretic) display, or a display using an interferometric modulation of light (English full name: Interferometric Modulation of Light) technology.

The image output unit 2011 may include a single display or a plurality of displays having different sizes. In a specific implementation of the present invention, a touchscreen may also be used as a display panel of the output unit 201.

For example, after the touchscreen detects a touch operation or a similar gesture operation on the touchscreen, the touchscreen transfers the touch operation or the gesture operation to the processor 203 to determine a type of a touch event. Subsequently, the processor 203 provides corresponding visual output on the display panel based on the type of the touch event. Although in FIG. 2, the input unit 205 and the output unit 201 are used as two independent components to implement input and output functions of the terminal device, in some embodiments, the touchscreen and the display panel may be integrated to implement the input and output functions of the terminal device. For example, the image output unit 2011 may display various graphical user interfaces (English full name: Graphical User Interface, English acronym: GUI) as virtual control components, including but not limited to a window, a scrollbar, an icon, and a clipboard, so that a user performs an operation in a touch control manner.

In a specific implementation of the present invention, the image output unit 2011 includes a filter and an amplifier, configured to filter and amplify a video output by the processor 203. The sound output unit 2012 includes a digital-to-analog converter, configured to convert an audio signal output by the processor 203 from a digital format into an analog format.

The processor 203 is configured to: run corresponding code, and process received information, to generate and output a corresponding interface.

Specifically, the processor 203 is a control center of the terminal device, and is connected to parts of the entire terminal device by using various interfaces and lines. By running or executing a software program and/or module stored in the memory, and invoking data stored in the memory, the processor 203 performs various functions of the terminal device and/or process data. The processor 203 may be formed by an integrated circuit (English full name: Integrated Circuit, English acronym: IC), for example, a single packaged IC, or may be formed by connecting a plurality of packaged ICs having a same function or different functions.

For example, the processor 203 may include only a central processing unit (English full name: Central Processing unit, English acronym: CPU), or may be a combination of a graphics processing unit (English full name: Graphics Processing Unit, English acronym: GPU), a digital signal processor (English full name: Digital Signal Processor, English acronym: DSP), and a control chip (for example, a baseband chip) in a communications unit. In an implementation of the present invention, the CPU may be a single computing core or may include a plurality of computing cores.

The memory 204 is configured to store the code and data, and the code is run by the processor 203.

Specifically, the memory 204 may be configured to store the software program and the module, and the processor 203 runs the software program and the module that are stored in the memory 204, to perform various functional applications of the terminal device and implement data processing. The memory 204 mainly includes a program storage area and a data storage area. The program storage area may store an operating system, an application required by at least one function such as a sound play program and an image play program, and the like. The data storage area may store data (such as audio data and a phone book) created based on use of the terminal device, and the like.

In a specific implementation of the present invention, the memory 204 may include a volatile memory, for example, a nonvolatile dynamic random access memory (English full name: Nonvolatile Random Access Memory, English acronym: NVRAM), a phase change random access memory (English full name: Phase Change RAM, English acronym: PRAM), or a magnetoresistive random access memory (English full name: Magnetoresistive RAM, English acronym: MRAM), or may include a nonvolatile memory, for example, at least one magnetic disk storage, an electrically erasable programmable read-only memory (English full name: Electrically Erasable Programmable Read-Only Memory, English acronym: EEPROM), or a flash memory component such as a NOR flash memory (English full name: NOR flash memory) or a NAND flash memory (English full name: NAND flash memory).

A nonvolatile memory stores an operating system and an application that are executed by the processor 203. The processor 203 loads a running program and data from the nonvolatile memory to a memory, and stores digital content in a mass storage apparatus. The operating system includes various components and/or drives configured to control and manage routine system tasks such as memory management, storage device control, and power management, and facilitate communication between hardware components and software components.

In an implementation of the present invention, the operating system may be an Android operating system of Google Inc., an iOS system developed by Apple Inc., a Windows operating system developed by Microsoft Corporation. or the like, or an embedded operating system such as VxWorks.

The application includes any application installed on the terminal device, and includes, but is not limited to, a browser, an email, an instant messaging service, text processing, keyboard virtualization, a window widget (Widget), encryption, digital copyright management, speech recognition, speech replication, positioning (for example, a function provided by a global positioning system), and music play.

The input unit 205 is configured to implement interaction between a user and the terminal device and/or input information to the terminal device.

For example, the input unit 205 may receive digit or character information entered by the user, to generate a signal input related to a user setting or function control. In a specific implementation of the present invention, the input unit 205 may be a touchscreen, or may be another human-computer interaction interface, such as a substantive input key or a microphone, or may be another external information capturing apparatus, for example, a camera.

The touchscreen in this embodiment of the present invention may collect a touch operation or a similar operation action of a user on the touchscreen, for example, an operation action performed by a user on the touchscreen or in a location near the touchscreen by using any suitable object or accessory such as a finger or a stylus, and drive a corresponding connection apparatus based on a preset program. Optionally, the touchscreen may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into coordinates of a contact, and sends the coordinates to the processor 203.

The touch controller may further receive a command sent by the processor 203, and execute the command. In addition, the touchscreen may be implemented in a plurality of types such as a resistive, capacitive, infrared, or surface sound wave type.

In another implementation of the present invention, the substantive input key used by the input unit 205 may include, but is not limited to, one or more of a physical keyboard, a function key (such as a volume control key or an on/off key), a trackball, a mouse, or a joystick. The input unit 205 in a form of the microphone may collect a voice input by the user or from an environment and convert the voice into a command that is in a form of an electrical signal and that can be executed by the processor 203.

In some other implementations of the present invention, the input unit 205 may be various sensing components, for example, a Hall element, configured to detect a physical quantity of the terminal device, such as a force, a torque, a pressure, a stress, a location, a displacement, a speed, an acceleration, an angle, an angular velocity, a revolution, a rotational speed, and a time at which a working state changes, to convert the physical quantity into a quantity of electricity to perform detection and control. Other sensing components may include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The communications unit 207 is configured to establish a communications channel, so that the terminal device connects to a remote server by using the communications channel and downloads media data from the remote server. The communications unit 207 may include a communications module such as a wireless local area network (English full name: Wireless Local Area Network, English acronym: wireless LAN) module, a Bluetooth module, or a baseband module, and a radio frequency (English full name: Radio Frequency, English acronym: RF) circuit corresponding to the communications module, and is configured to perform wireless local area network communication, Bluetooth communication, infrared communication, and/or communication of a cellular communications system, for example, wideband code division multiple access (English full name: Wideband Code Division Multiple Access, English acronym: W-CDMA) and/or high speed downlink packet access (English full name: High Speed Downlink Packet Access, English acronym: HSDPA). The communications module is configured to control communication of the components of the terminal device, and can support direct memory access.

In different implementations of the present invention, communications modules in the communications unit 207 usually appear in a form of an integrated circuit chip (English full name: Integrated Circuit Chip), can be combined selectively, and do not need to include all communications modules and corresponding antenna groups. For example, the communications unit 207 may include only a baseband chip, a radio frequency chip, and a corresponding antenna, to provide a communication function in a cellular communications system. The terminal device may be connected to a cellular network (English full name: Cellular Network) or the Internet by using a wireless communication connection established by the communications unit 207, for example, wireless local area network access or WCDMA access. In some optional implementations of the present invention, the communications module, for example, the baseband module, in the communications unit 207 may be integrated into the processor 203, typically, for example, an APQ+MDM series platform provided by the Qualcomm (Qualcomm) Inc.

The radio frequency circuit 208 is configured to receive and send a signal during an information receiving and sending process or during a call. For example, after downlink information of a base station is received, the downlink information is sent to the processor 203 for processing. In addition, designed uplink data is sent to the base station. Usually, the radio frequency circuit 208 includes a known circuit for executing these functions, including, but not limited to, an antenna system, a radio frequency transceiver, one or more amplifiers, a tuner, one or more oscillators, a digital signal processor, a codec (Codec) chip set, a subscriber identity module (SIM) card, and a memory. In addition, the radio frequency circuit 208 may also communicate with a network and another device by using wireless communication.

The wireless communication may use any communications standard or protocol, including, but not limited to, Global System for Mobile Communications (English full name: Global System of Mobile communication, English acronym: GSM), General Packet Radio Service (English full name: General Packet Radio Service, English acronym: GPRS), Code Division Multiple Access (English full name: Code Division Multiple Access, English acronym: CDMA), Wideband Code Division Multiple Access (English full name: Wideband Code Division Multiple Access, English acronym: WCDMA), high speed uplink packet access (English full name: High Speed Uplink Packet Access, English acronym: HSUPA). Long Term Evolution (English full name: Long Term Evolution, English acronym: LTE), an email, and Short Messaging Service (English full name: Short Messaging Service, English acronym: SMS).

A power supply 209 is configured to supply power to different components of the terminal device, to maintain operation of the terminal device. In a general understanding, the power supply 209 may be a built-in battery, such as a common lithium-ion battery or a NiMH battery, or may include an external power supply, for example, an AC adapter, that directly supplies power to the terminal device. In some implementations of the present invention, the power supply 209 may have broader definitions, for example, may also include a power management system, a charging system, a power failure detection circuit, a power converter or inverter, a power status indicator (for example, a light emitting diode), and any other component related to generation, management, and distribution of electric energy for the terminal device.

Figure 3:
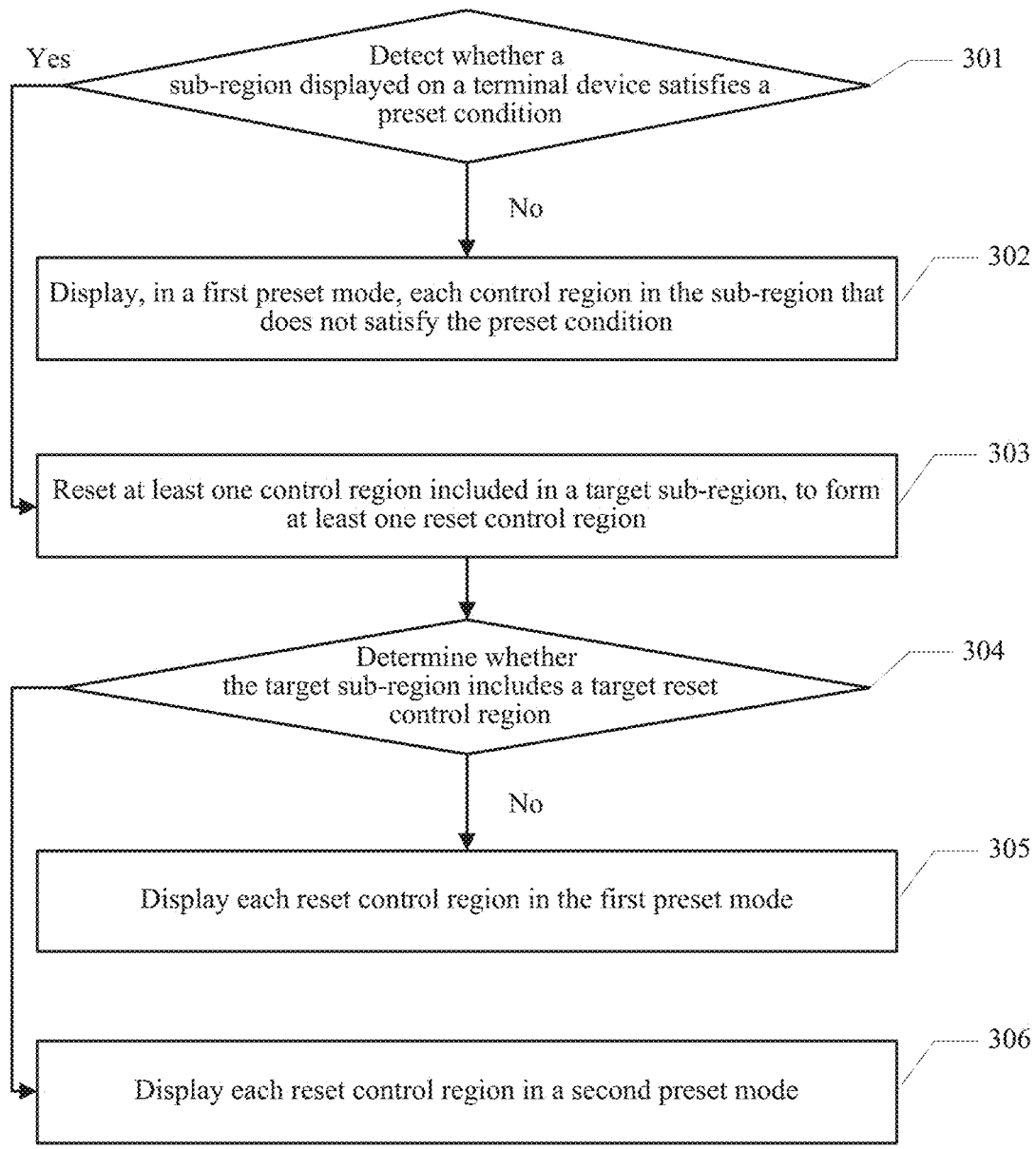
FIG. 3 is a flowchart of steps in an embodiment of drawing a character string in a control region according to the present invention.

The following describes, with reference to FIG. 3, the character string display method provided in the embodiments of the present invention. FIG. 3 is a flowchart of steps in an embodiment of drawing a character string in a control region according to the present invention.

To better understand the embodiments of the present invention, the following first describes the control region in this embodiment.

Specifically, the terminal device may preset a preset coordinate range, and each preset coordinate range corresponds to each control region, so that the control region is displayed in the preset coordinate range corresponding to the control region. As can be learned, in this embodiment, the terminal device sets a display location and a display range of the control region on the display screen by using the preset coordinate range.

Specifically, the control region provided in this embodiment includes a character string used to be displayed on the display screen of the terminal device.

A size of each preset control region is not limited in this embodiment, and content included in each control region is not limited in this embodiment.

Optionally, the control region may include an icon and/or a virtual button configured to respond to an operation event input by a user.

A quantity of control regions displayed on the display screen of the terminal device is not limited in this embodiment.

The following describes application scenarios of the control region in different use scenarios of the terminal device.

Figure 20:
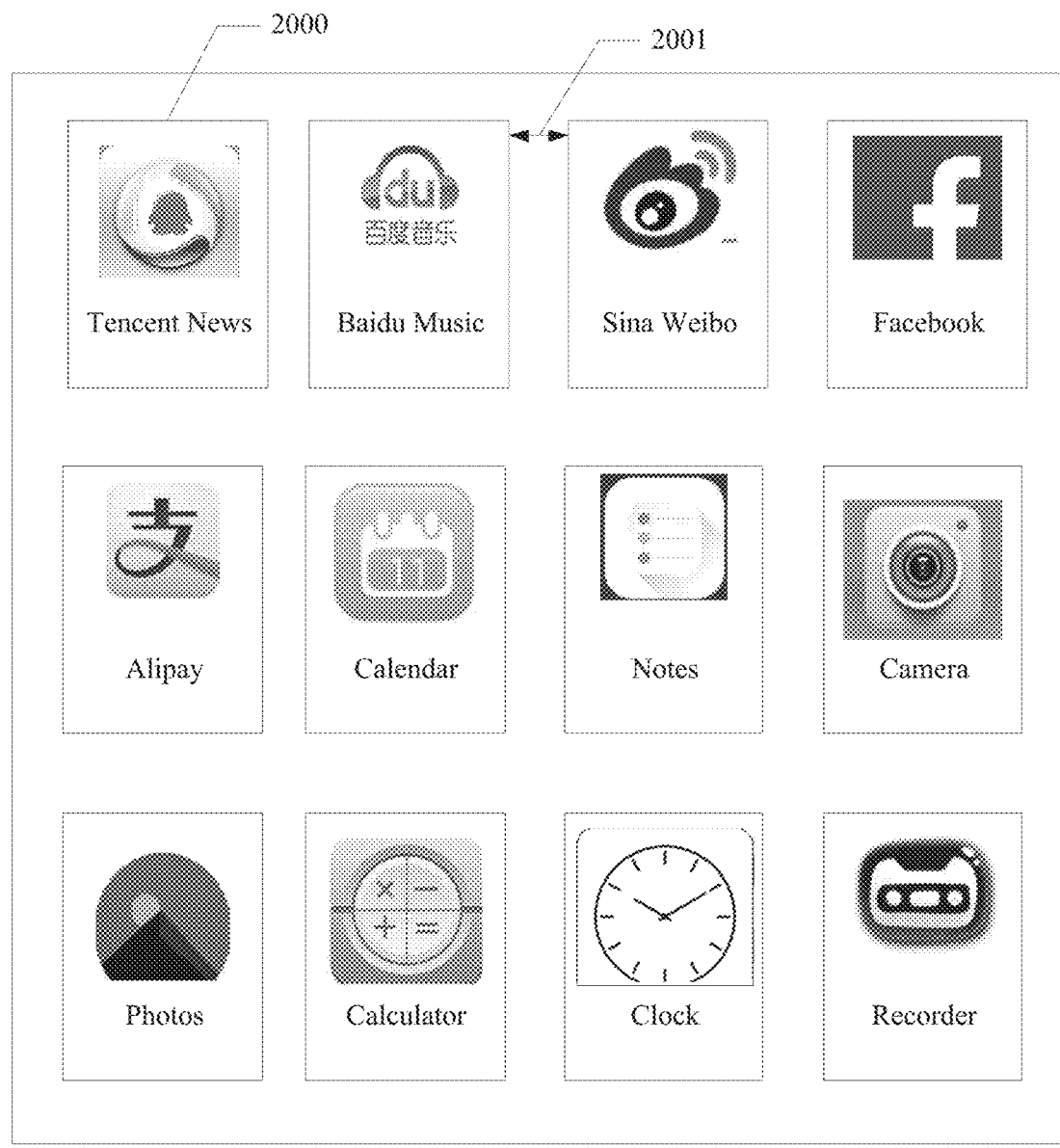
FIG. 20 is a schematic diagram of an embodiment in which a terminal device displays a home screen according to the present invention.

First, referring to FIG. 20, in a scenario in which the terminal device displays a home screen, the display screen of the terminal device displays a plurality of control regions 2000, an icon of an application and an application name corresponding to the application are disposed in each control region 2000, and a first gap 2001 is disposed between any two neighboring control regions in a landscape direction of the display screen of the terminal device. For example, in FIG. 20, a first gap 2001 is disposed between a control region used for displaying an icon of Baidu Music and a control region used for displaying an icon of Sina Weibo. A specific quantity of the control regions 2000 and a size of the first gap are not limited in this embodiment.

Figure 21:
FIG. 21 is a schematic diagram of an embodiment in which a terminal device displays a level-1 interface of an application according to the present invention.

Another application scenario is shown in FIG. 21, and in this application scenario, the control region is displayed on an application interface. The application interface is not limited in this embodiment. For example, the application interface may be a level-1 interface or a level-2 interface of an application.

In this application scenario, a level-1 application interface of Baidu Mobile is used as an example. It should be clarified that an example of an application in this embodiment is an optional example, and is not limited.

As shown in FIG. 21, the level-1 interface of the application Baidu Mobile displays a plurality of control regions 2100, and a virtual button 2101 is disposed in each control region 2100. The virtual button 2101 is configured to receive a touch instruction entered by a user, and after receiving the touch instruction entered by the user, the terminal device controls the interface of the application to jump to an application interface corresponding to the virtual button.

For example, in FIG. 21, if a virtual button "Map" receives a touch instruction entered by the user, the terminal device controls Baidu Mobile to jump from the level-1 interface to an interface used for implementing a map function.

In this embodiment, a first gap 2102 is disposed between any two neighboring control regions in the landscape direction of the display screen of the terminal device. For example, in FIG. 21, a first gap 2102 is disposed between a control region used for displaying a virtual button "Video" and a control region used for displaying a virtual button "Icon". A specific quantity of the control regions 2100 and a size of the first gap are not limited in this embodiment.

Figure 22:
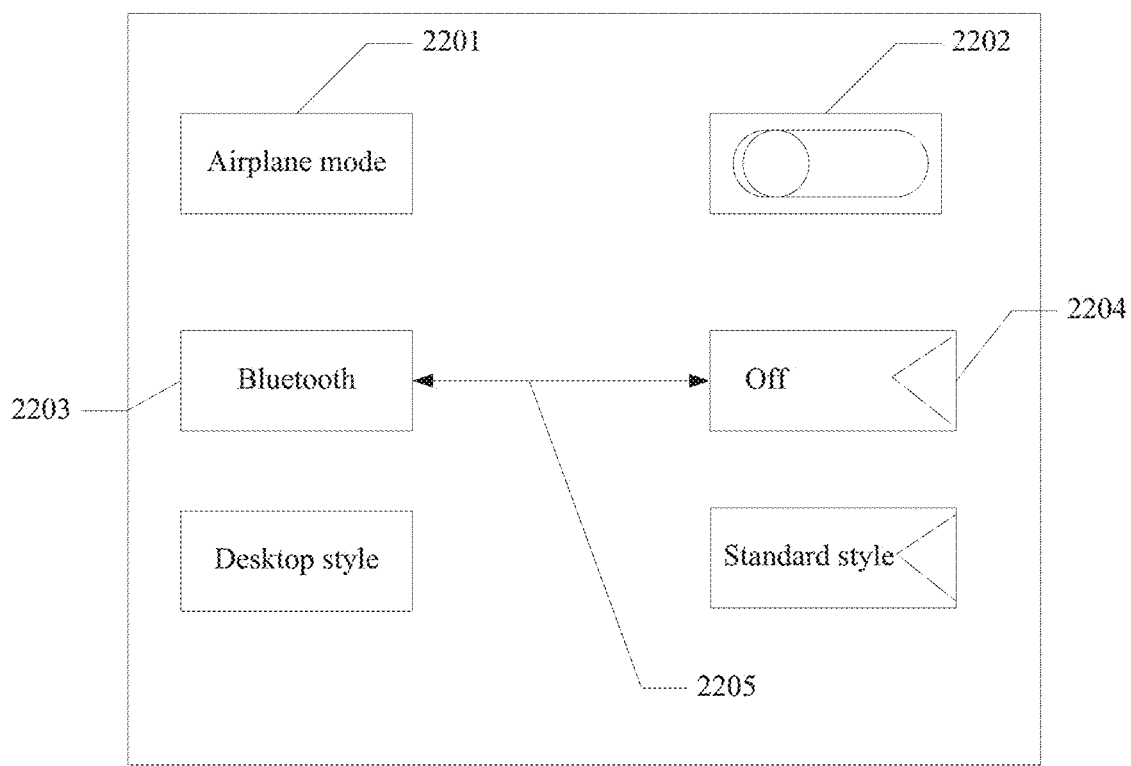
FIG. 22 is a schematic diagram of another embodiment in which a terminal device displays a level-1 interface of an application according to the present invention.

Another application scenario is shown in FIG. 22. In this application scenario, the control region is used for displaying menu options, and each menu option is used for controlling the terminal device to perform a function corresponding to the menu option. It should be clarified that the function of the menu option in this embodiment is an optional example, and is not limited. In another application scenario, the menu option may alternatively perform another function, for example, implement redirection of an application interface.

For example, in this application scenario, an application is a system application "Settings" of the terminal device. As shown in FIG. 22, when a level-1 interface of the system application "Settings" is displayed, the level-1 interface of the application "Settings" displays a plurality of control regions. A specific quantity of the control regions is not limited in this embodiment.

In this application scenario, two matching control regions are disposed in the landscape direction of the display screen, for example, a control region 2201 and a control region 2202 that match each other.

The control region 2201 displays a menu option "Airplane mode", and the control region 2202 displays whether the menu option "Airplane mode" is turned on. For example, in FIG. 22, when a user learns from the control region 2202 that the airplane mode of the terminal device is not turned on currently, the user may enter a touch instruction in the control region 2201 and/or the control region 2202, and when the control region 2201 and/or the control region 2202 receives the touch instruction, the terminal device controls the "Airplane mode" to be turned on, and controls the control region 2202 to display an on state of the "Airplane mode".

For another example, the control region 2203 displays a menu option "Bluetooth", and the control region 2204 displays a character string indicating whether the menu option "Bluetooth" is turned on. For example, in FIG. 22, when the user learns from the control region 2204 that the Bluetooth of the terminal device is not turned on currently, the user may enter a touch instruction in the control region 2203 and/or the control region 2204, and when the control region 2203 and/or the control region 2204 receives the touch instruction, the terminal device displays a drop-down list corresponding to the Bluetooth, and the drop-down list corresponding to the Bluetooth may display a touch button of whether to turn on the Bluetooth, a character string used for displaying a Bluetooth device name, a character string used for displaying a name of the current terminal device, and the like. Specific display content of the drop-down list corresponding to the Bluetooth is not limited in this embodiment.

In this embodiment, a first gap 2205 is disposed between any two neighboring control regions in the landscape direction of the display screen of the terminal device. For example, in FIG. 22, a first gap 2205 is disposed between the control region 2203 used for displaying the menu option "Bluetooth" and the control region 2204 used for displaying the character string indicating whether the Bluetooth is turned on. A specific quantity of the control regions and a size of the first gap are not limited in this embodiment.

Step 301. Detect whether a sub-region displayed on the terminal device satisfies a preset condition, and if the sub-region does not satisfy the preset condition, perform step 302, or if the sub-region satisfies the preset condition, perform step 303.

In this embodiment, the display screen of the terminal device is divided into at least one sub-region in the landscape direction of the terminal device, and at least one control region is disposed in each sub-region.

It should be clarified that in this embodiment, that the display screen is divided into the sub-region in the landscape direction of the terminal device is an optional example, and is not limited. In specific application, a specific division manner of the sub-region is not limited in this embodiment.

For example, sub-region division may be performed in a portrait direction of the display screen, or sub-region division may be performed randomly.

Figure 4:
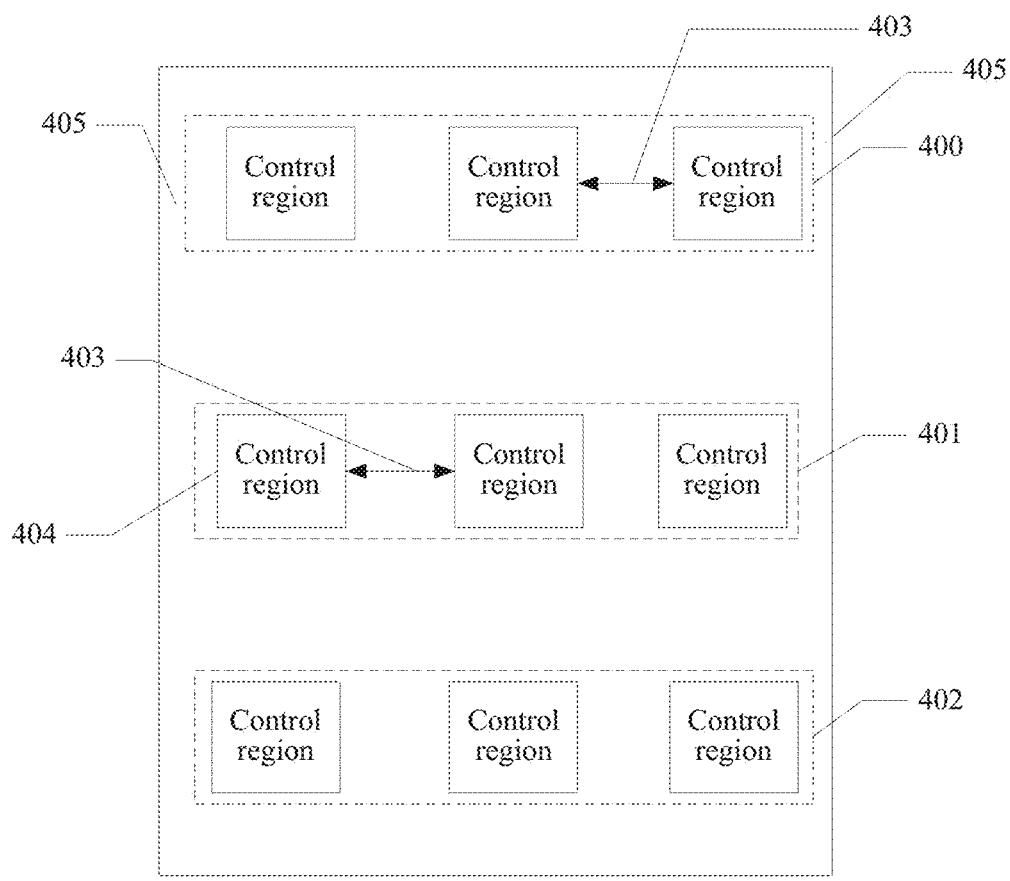
FIG. 4 is a schematic structural diagram of an embodiment of a sub-region displayed on a terminal device according to the present invention.

FIG. 4 is used as an example, and FIG. 4 is a schematic structural diagram of an embodiment of a sub-region displayed on a terminal device according to the present invention.

As can be learned from FIG. 4, the display screen of the terminal device is divided into three sub-regions in the landscape direction of the terminal device, namely, a sub-region 400, a sub-region 401, and a sub-region 402.

Optionally, in this embodiment, a second preset gap 405 is disposed between each of two sides of the sub-region and an edge of the display screen of the terminal.

A size of the second preset gap 405 is not limited in this embodiment.

In specific application, the second preset gap 405 may not be disposed, so that the two sides of the sub-region abut against the edge of the display screen of the terminal device.

In this embodiment, the sub-region is used for disposing control regions.

Specifically, a first preset gap 403 is disposed between any two neighboring control regions in a same sub-region.

A size of the first preset gap 403 is not limited in this embodiment.

Each sub-region displayed on the display screen of the terminal device provided in this embodiment includes a plurality of control regions.

In this embodiment, the preset condition is: the sub-region includes at least one target control region.

A length of a character string included in the target control region is greater than a length of the target control region.

In this embodiment, if it is detected that the sub-region displayed on the display screen of the terminal device does not satisfy the preset condition, that is, the sub-region that does not satisfy the preset condition does not include the target control region, step 302 is performed.

Specifically, if the terminal device determines that a length of a character string in any one of the plurality of control regions included in the sub-region is less than or equal to a length of the control region, step 302 is performed.

In this embodiment, if it is detected that the sub-region displayed on the display screen of the terminal device satisfies the preset condition, that is, the sub-region satisfying the preset condition includes at least one target control region, step 303 is performed.

Specifically, if the terminal device determines that a length of a character string in at least one of the plurality of control regions included in the sub-region is greater than a length of the control region, step 303 is performed.

Step 302. Display, in a first preset mode, each control region in the sub-region that does not satisfy the preset condition.

If it is detected that the sub-region displayed on the display screen of the terminal device does not satisfy the preset condition, a display effect of each control region in the sub-region that does not satisfy the preset condition does not need to be modified, and the control region is directly displayed in the first preset mode.

The first preset mode is not limited in this embodiment provided that a character string displayed in each control region can be displayed in a manner of a single line, that is, the character string in each control region does not need to be displayed in a line breaking manner, thereby effectively ensuring efficiency of reading, by a user, a character string.

For example, in this embodiment, the character string displayed in each control region is a name of the icon, and the first preset mode may be: displaying the character string in each control region in the control region in a centered manner.

Figure 1:
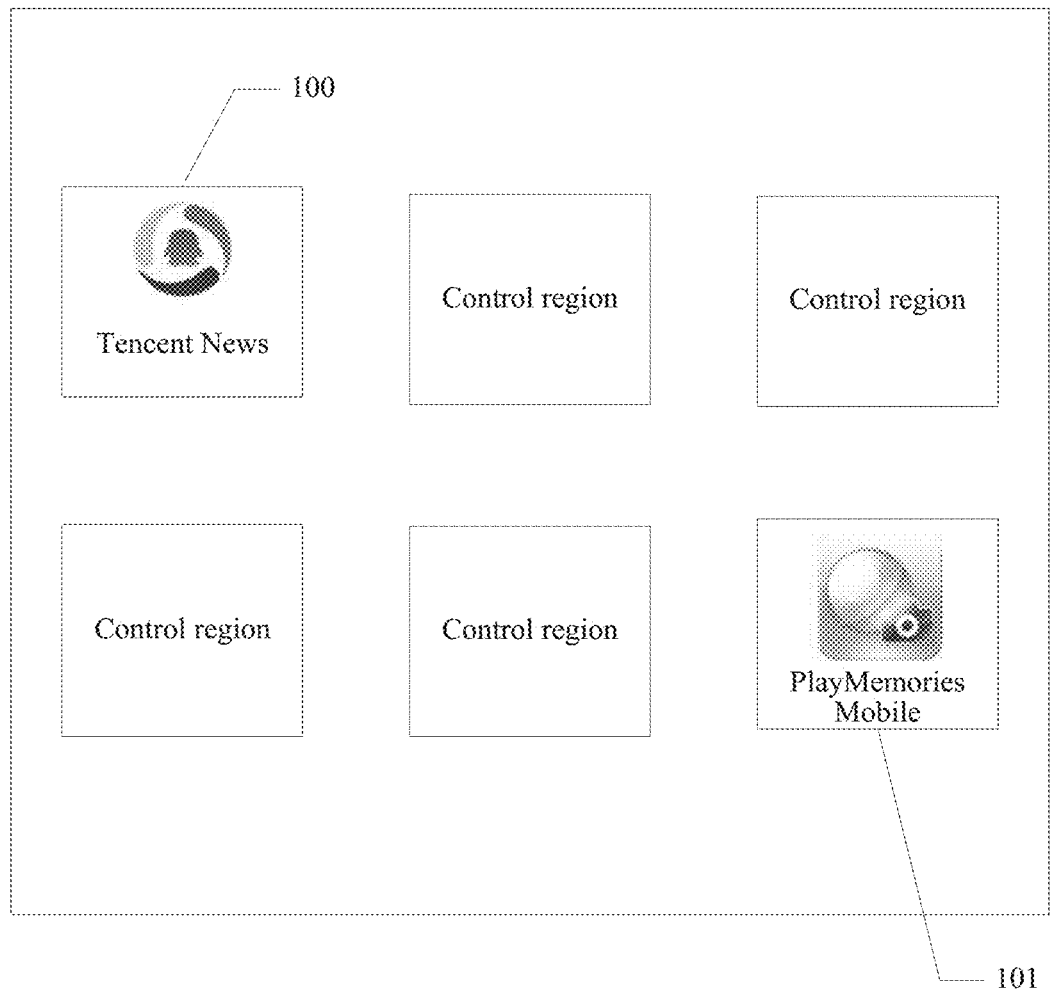
FIG. 1 is a schematic diagram of a display effect of an embodiment in which a display screen of a terminal device displays a plurality of control regions in the prior art.

As shown in FIG. 1, a character string "Tencent News" in a control region 100 is displayed in a centered manner.

Step 303. Reset at least one control region included in a target sub-region, to form at least one reset control region.

Optionally, in a process of performing step 301, if the terminal device detects that the sub-region displayed by the terminal device satisfies the preset condition, the terminal device may generate control information, so that the terminal device is triggered to perform step 303 based on the control information.

Optionally, in this embodiment, step 301 and step 302 are optional steps, and in an application scenario, step 301 and step 302 may not be performed. The control information may be entered by the user to the terminal device.

For example, when the user resets a language of the terminal device, for example, in this embodiment, the user sets the language of the terminal device from Chinese to English, the terminal device may display an operation interface on the display screen, where the operation interface may indicate whether the user needs to set a control region to form the reset control region. If the user notifies the terminal device by using the operation interface that the control region needs to be set to form the reset control region, the terminal device may generate the control information based on an operation of the user, where the control information is used to trigger the terminal device to perform step 303.

In this embodiment, the target sub-region is a sub-region satisfying the preset condition.

A length of the reset control region is a reset length.

Specifically, a plurality of control regions included in the target sub-region include at least one target control region.

Still referring to FIG. 4, if it is determined that a length of a character string in a control region 404 in a sub-region 401 is greater than a length of the control region 404, it is determined that the control region 404 is a target control region.

A quantity of determined target sub-regions is not limited in this embodiment.

A quantity of target control regions included in the determined target sub-region is not limited in this embodiment provided that the target sub-region includes at least one target control region.

Specifically, a process of resetting the target sub-region is:

obtaining a length L of the target sub-region in the landscape direction of the terminal device;

obtaining a quantity N of the control regions included in the target sub-region; and determining that a reset length of each reset control region is L/N.

In this embodiment, the length of the target sub-region is not modified, so that a length obtained after the target sub-region is reset is the same as a length obtained before the target sub-region is reset.

Figure 5:
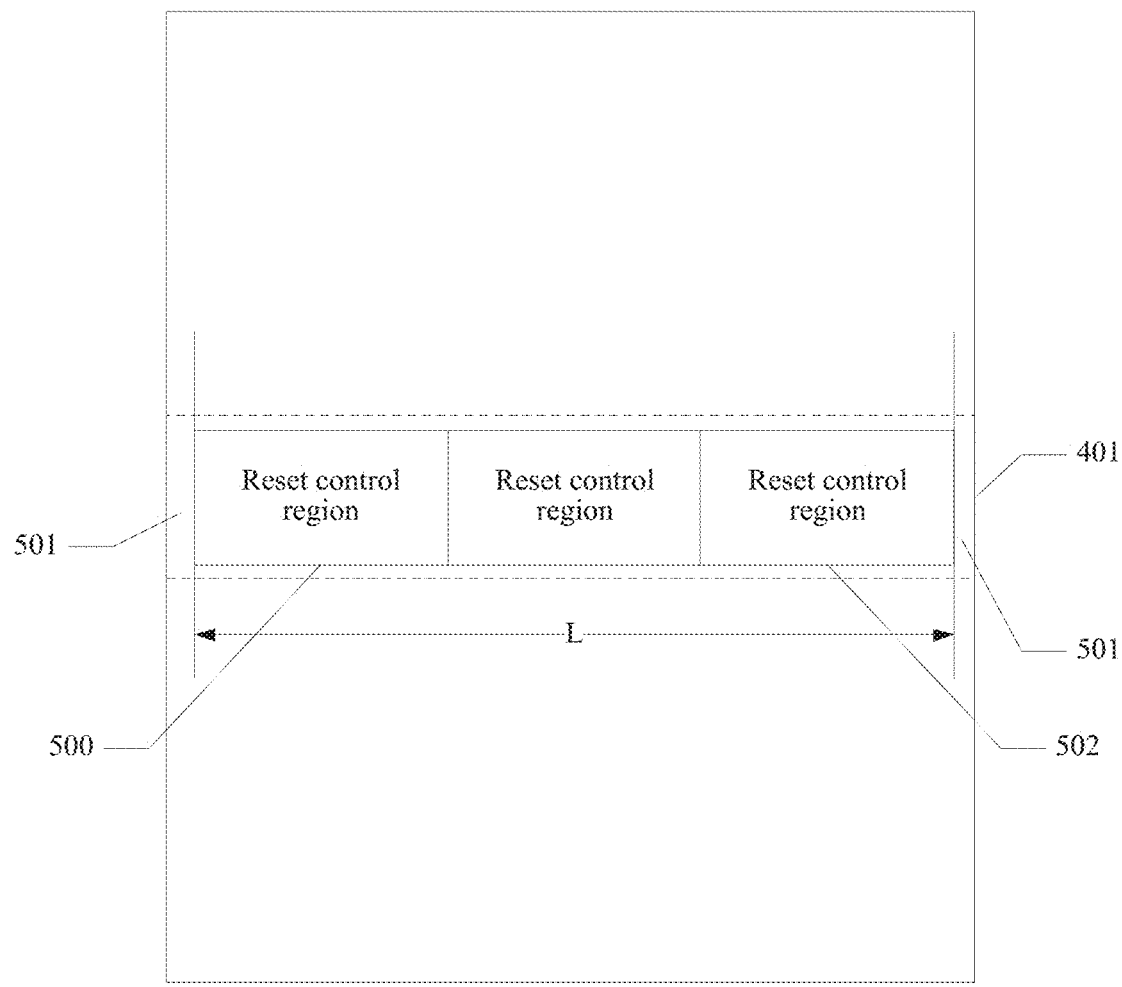
FIG. 5 is a schematic structural diagram of another embodiment of a sub-region displayed on a terminal device according to the present invention.

The following continues to give a description of an example with reference to FIG. 5. FIG. 5 is a schematic structural diagram of another embodiment of a sub-region displayed on a terminal device according to the present invention.

Specifically, FIG. 5 describes how to specifically reset a target sub-region. If the display screen of the terminal device is divided into a plurality of target sub-regions, for a division manner of each target sub-region, refer to FIG. 5, and details are not described in this embodiment.

As shown in FIG. 5, the terminal device obtains the length L of the target sub-region 401 in the landscape direction of the terminal device.

In this embodiment, due to different sizes of display screens of terminal devices, or different design requirements on a display mode of the terminal device, for different terminal devices, the target sub-region 401 has different lengths L in the landscape direction of the terminal device. This is not specifically limited in this embodiment.

The terminal device obtains the quantity N of the control regions included in the target sub-region 401.

As can be learned from FIG. 5, the quantity N of the control regions included in the target sub-region 401 is 3.

The terminal device determines that the reset length of each reset control region 500 is L/N.

As can be learned from FIG. 4 and FIG. 5, the following two conditions are satisfied after the target sub-region is reset:

Condition 1: Before the target sub-region is reset, as shown in FIG. 4, the first preset gap 403 is disposed between any two neighboring control regions in the target sub-region 401, and after the target sub-region is reset, as shown in FIG. 5, no first preset gap 403 is disposed between any two neighboring reset control regions in the target sub-region 401. That is, any two neighboring reset control regions in the target sub-region 401 abut against each other, and in a display effect, boundaries of any two neighboring reset control regions in the target sub-region 401 overlap with each other.

Condition 2: As shown in FIG. 5, reset control regions on two sides of the target sub-region 401 are a reset control region 501 and a reset control region 502, and a second preset gap 501 is disposed between the reset control region 501 and an edge of the display screen of the terminal device, and a second preset gap 501 is disposed between the reset control region 502 and an edge of the display screen of the terminal device. A size of the second preset gap 501 is not limited in this embodiment.

Step 304. Determine whether the target sub-region includes a target reset control region, and if the target sub-region does not include the target reset control region, perform step 305, or if the target sub-region includes the target reset control region, perform step 306.

In this embodiment, the target sub-region includes at least one reset control region.

The target reset control region satisfies a target condition, and the target condition is: a length of a character string included in a reset control region is greater than a reset length of the reset control region.

In this embodiment, the terminal device needs to make a judgment on the at least one reset control region included in the target sub-region one by one, to determine whether the target sub-region includes the target reset control region.

In this embodiment, step 305 is triggered to be performed only when no target reset control region is included in all reset control regions included in the target sub-region, that is, a length of a character string included in each reset control region included in the target sub-region is less than or equal to a reset length of the reset control region.

If the target sub-region includes at least one target reset control region, step 306 is triggered to be performed.

Step 305. Display each reset control region in the first preset mode.

In this embodiment, if it is determined that the length of the character string in each reset control region included in the target sub-region displayed on the display screen of the terminal device is less than or equal to the reset length of the reset control region, the character string in each reset control region may be controlled to be displayed in a centered manner.

It should be clarified that a manner of displaying the character string displayed in each reset control region is not limited in this embodiment provided that the character string displayed in each reset control region can be displayed in a manner of a single line, that is, the character string in each reset control region does not need to be displayed in a line breaking manner, thereby effectively ensuring efficiency of reading, by a user, a character string.

Step 306. Display each reset control region in a second preset mode.

The following describes in detail the second preset mode in this embodiment. It should be clarified that in this embodiment, due to different lengths of character strings in the reset control region, the reset control region may have different second preset modes.

The following describes lengths of different character strings in different reset control regions.

In one case, the reset control region is located at a first location, and the reset control region located at the first location and reset control regions on two sides of the reset control region located at the first location all satisfy a first condition.

In this embodiment, the first condition is: a length of a character string in the reset control region is greater than a reset length of the reset control region.

In this embodiment, a reset control region is disposed on each of the two sides of the reset control region located at the first location.

Figure 6:
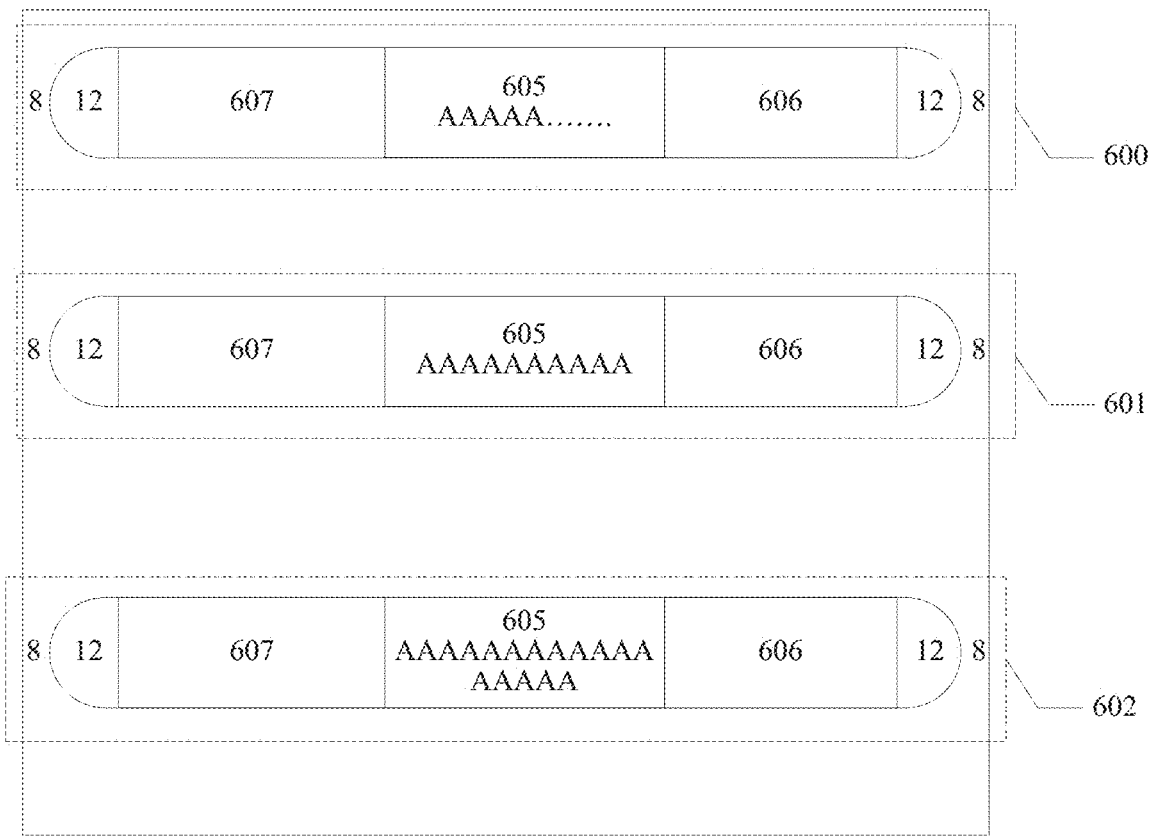
FIG. 6 is a schematic diagram of an embodiment in which a terminal device displays a character string in a control region according to the present invention.

As shown in FIG. 6, the reset control region located at the first location is a reset control region 605, and the reset control region 605 is located between the reset control region 607 and the reset control region 606.

This embodiment is described by using an example in which each sub-region shown in FIG. 6 includes three reset control regions. In specific application, a quantity of reset control regions that may be included in the sub-region is not limited in this embodiment.

It should be further clarified that this embodiment is described by using an example in which the reset control region 607 and the reset control region 606 are located at edges of the sub-region. In specific application, in this setting manner, the reset control region 607 and the reset control region 606 only need to be located on two sides of the reset control region 605.

In FIG. 6, content of a character string in each reset control region is not limited.

As can be learned from FIG. 6, the reset control region 605 located at the first location satisfies the first condition, that is, a length of a first character string in the reset control region 605 is greater than a reset length of the reset control region 605.

In this case, the reset control region 607 and the reset control region 606 located on the two sides of the reset control region 605 also satisfy the first condition, that is, a length of a character string in the reset control region 607 is greater than a reset length of the reset control region 607, and a length of a character string in the reset control region 606 is greater than a reset length of the reset control region 606.

In this case, the second preset mode may be:

if a length of the first character string on which target processing has been performed is less than or equal to the length of the reset control region located at the first location, the first character string on which the target processing has been performed is displayed in the reset control region 605 in a centered manner.

In this setting manner, the target processing is: shrinking any character in the first character string in the reset control region located at the first location, so that the shrunk any character in the first character string is greater than or equal to a first preset value.

The first preset value is not limited in this embodiment provided that the user can clearly view the character greater than or equal to the first preset value.

The first preset value may be initialized by a manufacturer during delivery, or may be customized by the user based on a requirement of the user. For example, the terminal device may push a setting interface to the user, and the setting interface is used for instructing the user to set a minimum font size, that is, the first preset value.

Using a display mode 600 shown in FIG. 6 as an example, a sub-region in the display mode 600 includes the reset control region 605, the reset control region 607, and the reset control region 606.

The reset control region located at the first location is the reset control region 605. If the length of the first character string in the reset control region 605 is greater than the reset length of the reset control region 605, the target processing may be performed on a character in the reset control region 605.

If the length of the first character string on which the target processing has been performed is less than or equal to the length of the reset control region, the first character string on which the target processing has been performed is displayed in the reset control region in a centered manner.

Still with reference to FIG. 6, when the length of the first character string on which the target processing has been performed is less than or equal to the length of the reset control region 605, the display mode in FIG. 6 is switched from the display mode 600 to a display mode 601, and in the display mode 601, the first character string in the reset control region 605 is shrunk. When it is ensured that any character in the shrunk first character string is greater than or equal to the first preset value, if the length of the first character string is less than or equal to the length of the reset control region 605, the first character string on which the target processing has been performed is displayed in the reset control region 605 in a centered manner.

If the length of the first character string on which the target processing has been performed is greater than the length of the reset control region, the first character string on which the target processing has been performed is displayed in the reset control region in a line breaking manner.

Still with reference to FIG. 6, when the length of the first character string on which the target processing has been performed is greater than the length of the reset control region 605, the display mode in FIG. 6 is switched from the display mode 600 to a display mode 602, and in the display mode 602, the first character string in the reset control region 605 is shrunk. When it is ensured that any character in the shrunk first character string is greater than or equal to the first preset value, the shrunk first character string is displayed in the reset control region 605 in a line breaking manner.

In this embodiment, the first preset gap is disposed between the first character string displayed in the reset control region satisfying the first condition and a character string satisfying the second condition. For specific descriptions of the first preset gap, refer to the foregoing descriptions, and details are not described again.

Further optionally, if the terminal device determines that characters in the reset control region 605 cannot be displayed in the reset control region 605 in a single line even after being shrunk, the terminal device may not shrink the characters in the reset control region 605, but directly displays the characters in a line breaking manner.

As can be learned from this case, because a length of a control region in the prior art is extended, a reset control region in this embodiment can display a longer character string. In addition, when reset control regions on left and right sides of a reset control region both satisfy the first condition, a character string in the reset control region may be shrunk. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

In another case, the reset control region is located at the first location, the reset control region located at the first location satisfies the first condition, a reset control region on one side of the reset control region located at the first location satisfies the first condition, and a reset control region on the other side of the reset control region located at the first location satisfies the second condition.

This embodiment is described by using an example in which the reset control region satisfying the second condition is located at a second location. The second location is either of the left and right sides of the first location.

Whether the reset control region located at the second location is located on the left side or the right side of the reset control region located at the first location is not limited in this embodiment. This embodiment is described by using an example in which the reset control region on the left side of the reset control region located at the first location satisfies the first condition, and the reset control region on the right side of the reset control region located at the first location satisfies the second condition.

For the first condition, refer to the foregoing descriptions, and details are not described again.

The second condition is: a length of a character string in the reset control region is less than a reset length of the reset control region.

Figure 7:
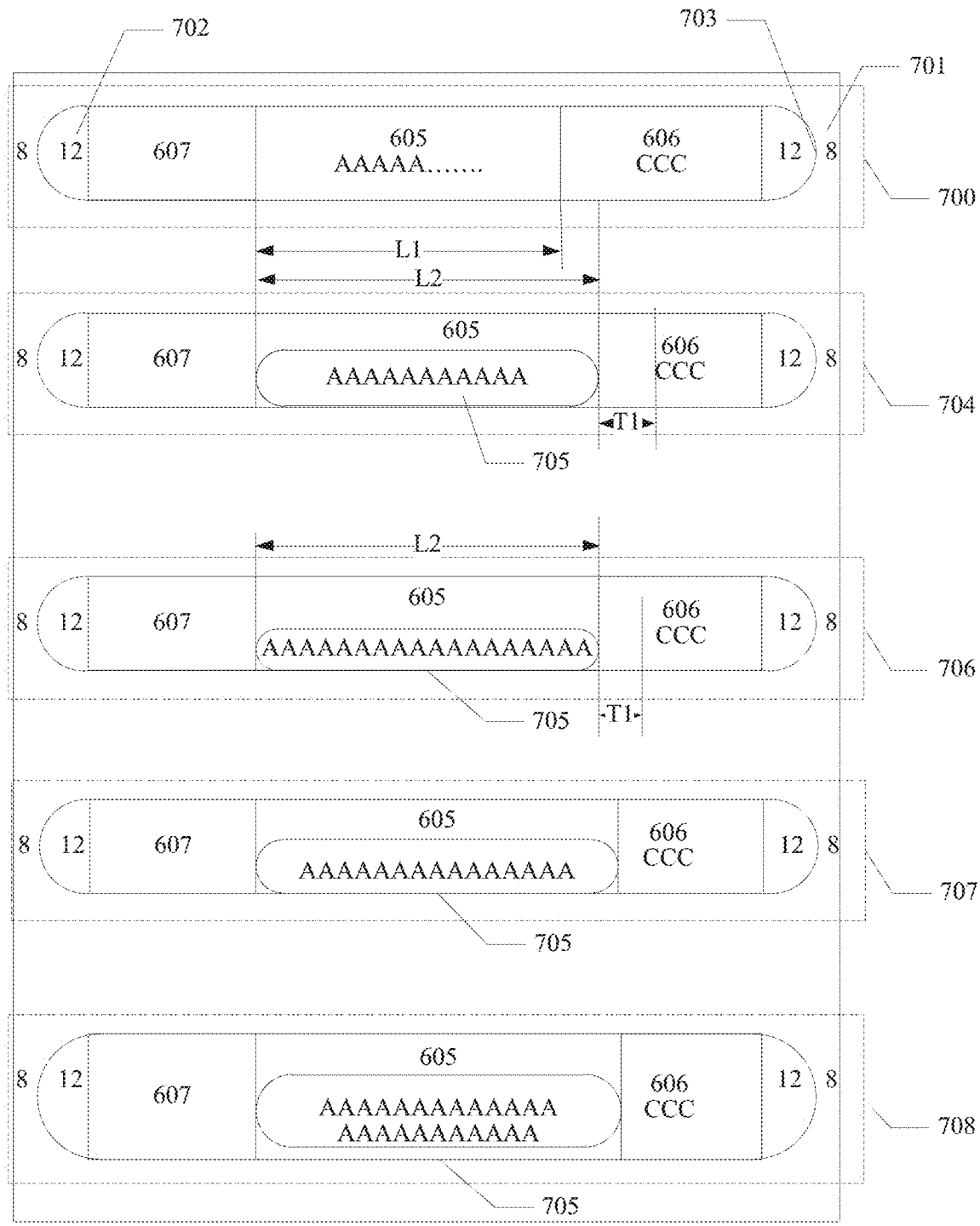
FIG. 7 is a schematic diagram of another embodiment in which a terminal device displays a character string in a control region according to the present invention.

A display mode 700 shown in FIG. 7 is used as an example. For example, in this embodiment, a sub-region included in the display mode 700 is a sub-region 703, and three reset control regions are disposed in the sub-region 703.

This embodiment is described by using an example in which each sub-region shown in FIG. 7 includes three reset control regions. In specific application, a quantity of reset control regions that may be included in the sub-region is not limited in this embodiment.

It should be further clarified that this embodiment is described by using an example in which the reset control region 607 and the reset control region 606 are located at edges of the sub-region. In specific application, in this setting manner, the reset control region 607 and the reset control region 606 only need to be located on the two sides of the reset control region 605.

Specifically, the reset control region 605 is the reset control region located at the first location, and the reset control region 605 is located between the reset control region 606 and the reset control region 607.

Specifically, in this embodiment, a gap between each of the two sides of the sub-region 703 and the edge of the display screen of the terminal device is a second preset gap 701. A size of the second preset gap 701 may be 8 dp, and 1 dp=1/160 inches.

It should be clarified that the description of the size of the second preset gap 701 in this embodiment is an optional example, and is not limited.

In this embodiment, a third preset gap 702 is disposed between an edge on a left side of the sub-region 703 and the reset control region 607 in the landscape direction of the terminal device, and a third preset gap 702 is disposed between an edge on a right side of the sub-region 703 and the reset control region 606 in the landscape direction of the terminal device.

The third preset gap 702 shown in FIG. 7 may be 12 dp.

It should be clarified that the description of the size of the third preset gap 702 in this embodiment is an optional example, and is not limited.

It should be further clarified that in specific application, whether to dispose the second preset gap 701 and the third preset gap 702 is not limited in this embodiment.

As shown in FIG. 7, in a process of resetting the sub-region 700, the reset control region 605 located at the first location has the reset length.

For how to determine the reset length, refer to the foregoing embodiment, and details are not described in this embodiment again.

In this case, because the length of the first character string in the reset control region 605 is greater than the length of the reset control region 605, in order that the entire first character string can be displayed, in this case, the second preset mode may be:

the first character string is displayed in a manner of at least one line of character string, and a distance between any line of the at least one line of character string and a second character string is greater than or equal to the second preset value.

The first character string is a character string in the reset control region located at the first location, and the second character string is a character string in the reset control region located at the second location.

Specifically; in the display mode 700 shown in FIG. 7, the first character string in the control region 605 located at the first location cannot be displayed in the reset control region 605 entirely, that is, a length of a single line of displaying the first character string is greater than the length L1 of the reset control region 605.

A single-line display region of the first character string is determined. A length of the single-line display region of the first character string is greater than a length of the reset control region located at the first location, and a distance between the single-line display region of the first character string and the second character string is greater than or equal to the second preset value.

Specifically, as can be learned from FIG. 7, in the display mode 700, if the length of the single line of displaying the first character string is greater than the length L1 of the reset control region 605, the display mode 700 is switched to a display mode 704, and in the display mode 704, the terminal device determines a single-line display region 705 of the first character string.

More specifically, a length L2 of the single-line display region 705 of the first character string is greater than L1, and a distance between the single-line display region 705 of the first character string and the second character string in the reset control region 606 is greater than or equal to the second preset value T1.

Optionally, in this embodiment, the single-line display region 705 of the first character string is formed by extending all or some regions in the reset control region located at the first location towards the second character string.

Specifically, for example, as shown in FIG. 7, the reset control region 605 located at the first location may include a region used for displaying an icon and a region used for displaying a character string. When the length of the first character string is greater than the length of the reset control region 605, all regions in the reset control region 605 may be extended towards the second character string until the distance between the single-line display region 705 of the first character string and the second character string is greater than or equal to the second preset value, or the region used for displaying a character string in the reset control region 605 may be extended towards the second character string until a distance between the region used for displaying a character string in the single-line display region 705 of the first character string and the second character string is greater than or equal to the second preset value.

As can be learned, in this embodiment, the first character string can move towards the second character string in the reset control region 605.

In this embodiment, a specific process of extending the single-line display region 705 of the first character string may be as follows.

Specifically, in the process of extending the single-line display region 705 of the first character string towards the second character string, if the length of the single-line display region 705 of the first character string is greater than or equal to the length of the single line of displaying the first character string, the single-line display region 705 of the first character string is no longer extended.

In the process of extending the single-line display region 705 of the first character string towards the second character string, if the distance between the single-line display region 705 of the first character string and the second character string is equal to the second preset value, and/or the length of the single-line display region 705 of the first character string is greater than or equal to the length of the single line of displaying the first character string, the single-line display region 705 of the first character string is no longer extended towards the second character string.

A specific process of displaying the first character string in this embodiment is as follows.

Whether the length of the first character string is less than or equal to the length of the single-line display region of the first character string is determined.

If the length of the first character string is less than or equal to the length of the single-line display region of the first character string, the first character string is displayed in the single-line display region of the first character string in a manner of a single line.

Specifically, in the display mode 704 shown in FIG. 7, if the length of the first character string is less than or equal to the length L2 of the single-line display region 705 of the first character string, the first character string may be displayed in the single-line display region 705 of the first character string in a manner of a single line.

If the length of the first character string is greater than the length of the single-line display region of the first character string, optionally, one manner may be: displaying the first character string in the single-line display region of the first character string in a line breaking manner.

Specifically, in a display mode 706 shown in FIG. 7, if the length of the first character string is greater than the length L2 of the single-line display region 705 of the first character string, the first character string may be displayed in the single-line display region 705 of the first character string in at least two lines, so that a length of any line of the first character string is less than or equal to the determined length L2 of the single-line display region 705 of the first character string, and a distance between any line of the first character string and the second character string is greater than or equal to the second preset value.

If the length of the first character string is greater than the length of the single-line display region of the first character string, further optionally, another manner is: performing target processing on the first character string, and if a length of the first character string on which the target processing has been performed is less than or equal to the length of the single-line display region of the first character string, displaying, in the single-line display region of the first character string in a manner of a single line, the first character string on which the target processing has been performed, or if a length of the first character string on which the target processing has been performed is greater than the length of the single-line display region of the first character string, displaying, in the single-line display region of the first character string in a line breaking manner, the first character string on which the target processing has been performed.

Specifically, in a display mode 707 shown in FIG. 7, if the length of the first character string is greater than the length L2 of the single-line display region 705 of the first character string, the target processing may be performed on the first character string. For a specific process of the target processing, refer to the foregoing descriptions, and details are not described again. If a length of the shrunk first character string is less than or equal to the length of the single-line display region 705 of the first character string, the first character string on which the target processing has been performed is displayed in the single-line display region 705 of the first character string in a single line. In a display mode 708 shown in FIG. 7, if the length of the first character string is greater than the length L2 of the single-line display region 705 of the first character string, the target processing may be performed on the first character string, and if a length of the shrunk first character string is greater than the length of the single-line display region 705 of the first character string, the first character string on which the target processing has been performed is displayed in the single-line display region 705 of the first character string in a line breaking manner.

In this embodiment, a length of the second character string is less than a reset length of a reset control region in which the second character string is located, so that even though the first character string is extended towards the second character string, the second character string can be displayed in a single line without being broken in the reset control region satisfying the second condition.

In this embodiment, the second character string may be displayed in the reset control region 606 in a centered manner. Certainly, a specific location at which the second character string is displayed in the reset control region 606 is not limited in this embodiment provided that it can be ensured that the distance between the first character string and the second character string is greater than the second preset value.

For example, in a process of extending the first character string towards the second character string, to avoid line breaking of the first character string as far as possible, the second character string may be extended towards the display screen of the terminal device, that is, the second character string is extended towards the third preset gap 702, so that a target gap exists between the second character string and the edge of the display screen of the terminal device, so as to increase as much as possible the length of the single-line display region of the first character string for displaying the first character string. This embodiment does not limit a relationship between sizes of the target gap and the second preset gap 701.

Optionally, this embodiment is described by using an example in which the second preset value is 8 dp.

It should be clarified that in specific application, the second preset value is not limited in this embodiment.

In this embodiment, even though the first character string is controlled to be extended towards the second character string, it needs to be ensured that the distance between the first character string and the second character string is greater than or equal to the second preset value, so that it is effectively avoided that a user mixes the first character string up with the second character string in a reading process, and the user can clearly know that the first character string and the second character string are character strings in different reset control regions, thereby avoiding misunderstanding of the user in the reading process, and improving accuracy in the reading process of the user.

This embodiment is described by using an example in which the reset control region satisfying the second condition is located on a right side of the reset control region satisfying the first condition. If the reset control region satisfying the second condition is located on a left side of the reset control region satisfying the first condition, for a manner of extending a character string in the reset control region satisfying the first condition towards the reset control region on the left side, refer to this setting manner, and details are not described again.

As can be learned from this case, because a length of a control region in the prior art is extended, a reset control region in this embodiment can display a longer character string, and when one side of the reset control region satisfies the first condition, and the other side of the reset control region satisfies the second condition, a first character string in the reset control region can be extended towards a second character string in the reset control regions satisfying the second condition, and it is ensured that a distance between the first character string and the second character string is greater than or equal to the second preset value. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

In another case, the reset control region is located at the first location, the reset control region located at the first location satisfies the first condition, and reset control regions on two sides of the control region and located at the second location satisfy the second condition.

In this setting manner, for specific descriptions of the first condition and the second condition, refer to the foregoing setting manner, and details are not described again.

Figure 8:
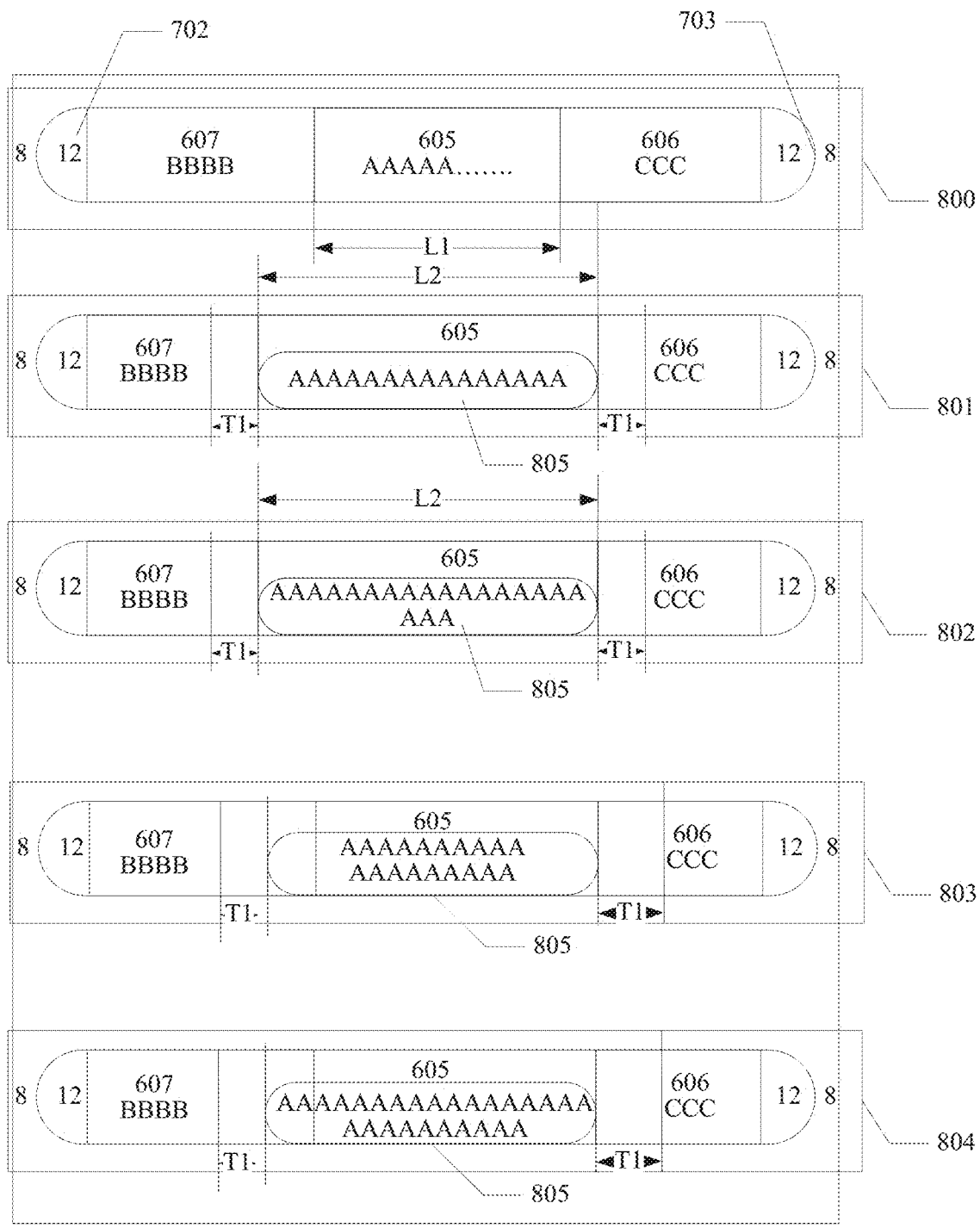
FIG. 8 is a schematic diagram of another embodiment in which a terminal device displays a character string in a control region according to the present invention.

In this case, as shown in FIG. 8, the reset control region located at the first location is the reset control region 605, and the reset control region 605 is located between the reset control region 607 and the reset control region 606.

This embodiment is described by using an example in which each sub-region shown in FIG. 8 includes three reset control regions. In specific application, a quantity of reset control regions that may be included in the sub-region is not limited in this embodiment.

It should be further clarified that this embodiment is described by using an example in which the reset control region 607 and the reset control region 606 are located at edges of the sub-region. In specific application, in this setting manner, the reset control region 607 and the reset control region 606 only need to be located on the two sides of the reset control region 605.

In this case, the reset control region 605 located at the first location satisfies the first condition, that is, a length of a first character string in the reset control region 605 is greater than a reset length of the reset control region 605.

The reset control region 607 and the reset control region 606 located on the two sides of the reset control region 605 satisfy the second condition, that is, a length of a third character string in the reset control region 607 is less than a reset length of the reset control region 607, and a length of a second character string in the reset control region 606 is less than a reset length of the reset control region 606.

In this case, because the length of the first character string in the reset control region 605 is greater than the length of the reset control region 605, in order that the entire first character string can be displayed, in this case, the second preset mode may be:

the first character string is displayed in a manner of at least one line of character string, a distance between any line of the at least one line of character string and the second character string is greater than or equal to the second preset value, and a distance between any line of the at least one line of character string and the third character string is greater than or equal to the second preset value.

For specific descriptions of the first character string, the second character string, and the third character string, refer to the foregoing descriptions, and details are not described herein again.

Specifically, in a display mode 800 shown in FIG. 8, the first character string in the control region 605 located at the first location cannot be displayed in the reset control region 605 entirely, that is, a length of a single line of displaying the first character string is greater than the length L1 of the reset control region 605.

A single-line display region of the first character string is determined. A length of the single-line display region of the first character string is greater than a length of the reset control region located at the first location, a distance between the single-line display region of the first character string and the second character string is greater than or equal to the second preset value, and a distance between the single-line display region of the first character string and the third character string is greater than or equal to the second preset value.

Specifically, as can be learned from FIG. 8, in the display mode 800, if the length of the single line of displaying the first character string is greater than the length L1 of the reset control region 605, the display mode 800 is switched to a display mode 801, and in the display mode 801, the terminal device determines a single-line display region 805 of the first character string.

More specifically, a length L2 of the single-line display region 805 of the first character string is greater than L1, a distance between the single-line display region 805 of the first character string and the second character string in the reset control region 606 is greater than or equal to the second preset value T1, and a distance between the single-line display region 805 of the first character string and the third character string in the reset control region 607 is greater than or equal to the second preset value T1.

Optionally, in this embodiment, the single-line display region 805 of the first character string is formed by extending all or some regions in the reset control region located at the first location separately towards two sides. That is, one end of the reset control region located at the first location is extended towards the second character string, and the other end of the reset control region located at the first location is extended towards the third character string.

Specifically, for example, as shown in FIG. 8, the reset control region 605 located at the first location may include a region used for displaying an icon and a region used for displaying a character string. When the length of the first character string is greater than the length of the reset control region 605, all regions in the reset control region 605 may be extended respectively towards the second character string and the third character string until the distance between the single-line display region 805 of the first character string and the second character string is greater than or equal to the second preset value and until the distance between the single-line display region 805 of the first character string and the third character string is greater than or equal to the second preset value. Alternatively, the region used for displaying a character string in the reset control region 605 may be extended separately towards the second character string and the third character string until the distance between the single-line display region 805 of the first character string and the second character string is greater than or equal to the second preset value and until the distance between the single-line display region 805 of the first character string and the second character string is greater than or equal to the second preset value.

As can be learned, in this embodiment, the first character string can separately move in the reset control region 605 towards the second character string and the third character string after center alignment.

In this embodiment, a specific process of extending the single-line display region 805 of the first character string may be as follows.

In this embodiment, distances by which the single-line display region 805 of the first character string is separately extended towards the two sides may be the same or may be different.

Specifically, in the process of extending the single-line display region 805 of the first character string evenly towards the two sides, if the length of the single-line display region 805 of the first character string is greater than or equal to the length of the single line of displaying the first character string, the single-line display region 805 of the first character string is no longer extended towards the two sides.

In the process of extending the single-line display region 805 of the first character string towards the second character string and the third character string, if the distance between the single-line display region 805 of the first character string and the second character string is equal to the second preset value, and the distance between the single-line display region 805 of the first character string and the third character string is greater than the second preset value, the single-line display region 805 of the first character string is no longer extended towards the second character string, but is extended towards the third character string until the length of the single-line display region 805 of the first character string is greater than or equal to the length of the single line of displaying the first character string and/or the distance between the single-line display region 805 of the first character string and the third character string is equal to the second preset value.

In the process of extending the single-line display region 805 of the first character string towards the second character string and the third character string, if the distance between the single-line display region 805 of the first character string and the third character string is equal to the second preset value, and the distance between the single-line display region 805 of the first character string and the second character string is greater than the second preset value, the single-line display region 805 of the first character string is no longer extended towards the third character string, but is extended towards the second character string until the length of the single-line display region 805 of the first character string is greater than or equal to the length of the single line of displaying the first character string and/or the distance between the single-line display region 805 of the first character string and the second character string is equal to the second preset value.

A specific process of displaying the first character string in this embodiment is as follows.

Whether the length of the first character string is less than or equal to the length of the single-line display region of the first character string is determined.

If the length of the first character string is less than or equal to the length of the single-line display region of the first character string, the first character string is displayed in the single-line display region of the first character string in a manner of a single line.

Specifically, in the display mode 801 shown in FIG. 8, if the length of the first character string is less than or equal to the length L2 of the single-line display region 805 of the first character string, the first character string may be displayed in the single-line display region 805 of the first character string in a manner of a single line.

If the length of the first character string is greater than the length of the single-line display region of the first character string, optionally, one manner may be: displaying the first character string in the single-line display region of the first character string in a line breaking manner.

Specifically, in a display mode 802 shown in FIG. 8, if the length of the first character string is greater than the length L2 of the single-line display region 805 of the first character string, the first character string may be displayed in the single-line display region 705 of the first character string in at least two lines, so that a length of any line of the first character string is less than or equal to the determined length L2 of the single-line display region 705 of the first character string, and a distance between any line of the first character string and the second character string is greater than or equal to the second preset value.

If the length of the first character string is greater than the length of the single-line display region of the first character string, further optionally, another manner is: performing target processing on the first character string, and if a length of the first character string on which the target processing has been performed is less than or equal to the length of the single-line display region of the first character string, displaying, in the single-line display region of the first character string in a manner of a single line, the first character string on which the target processing has been performed, or if a length of the first character string on which the target processing has been performed is greater than the length of the single-line display region of the first character string, displaying, in the single-line display region of the first character string in a line breaking manner, the first character string on which the target processing has been performed.

Specifically, in a display mode 803 shown in FIG. 8, if the length of the first character string is greater than the length L2 of the single-line display region 805 of the first character string, the target processing may be performed on the first character string. For a specific process of the target processing, refer to the foregoing descriptions, and details are not described again. If the length of the shrunk first character string is less than or equal to the length of the single-line display region 805 of the first character string, the first character string on which the target processing has been performed is displayed in the single-line display region 805 of the first character string in a single line. In a display mode 804 shown in FIG. 8, if the length of the first character string is greater than the length L2 of the single-line display region 805 of the first character string, the target processing may be performed on the first character string, and if a length of the shrunk first character string is greater than the length of the single-line display region 805 of the first character string, the first character string on which the target processing has been performed is displayed in the single-line display region 805 of the first character string in a line breaking manner.

In this embodiment, the length of the second character string is less than the reset length of the reset control region in which the second character string is located, and the length of the third character string is less than the reset length of the reset control region in which the third character string is located, so that even though the first character string is extended towards the second character string, the second character string can be displayed in a single line without being broken in the reset control region satisfying the second condition, and even though the first character string is extended towards the third character string, the third character string can be displayed in a single line without being broken in the reset control region satisfying the second condition.

In this embodiment, for a specific manner of displaying the second character string and the third character string, refer to the foregoing descriptions, and details are not described again.

In this embodiment, even though the first character string is controlled to be extended towards the second character string and the third character string, it needs to be ensured that the distance between the first character string and the second character string is greater than or equal to the second preset value, and the distance between the first character string and the third character string is greater than or equal to the second preset value, so that it can be effectively avoided that the user mixes the first character string up with the second character string and the third character string in a reading process, and the user can clearly know that the first character string, the second character string, and the third character string respectively are character strings in different reset control regions, thereby avoiding misunderstanding of the user in the reading process, and improving accuracy in the reading process of the user.

As can be learned from this case, because a length of a control region in the prior art is extended, a reset control region in this embodiment can display a longer character string, and when the reset control regions on two sides of the reset control region located at the first location both satisfy the second condition, the first character string in the reset control region can be extended towards the second character string and the third character string in the reset control regions satisfying the second condition, and it is ensured that a distance between the first character string and the second character string is greater than or equal to the second preset value and a distance between the first character string and the third character string is greater than or equal to the second preset value. Therefore, compared with the prior art in which a character string is not modified, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

In another case, the reset control region is located at a third location, the reset control region located at the third location satisfies the first condition, and a reset control region adjacent to the reset control region located at the third location satisfies the first condition.

Figure 9:
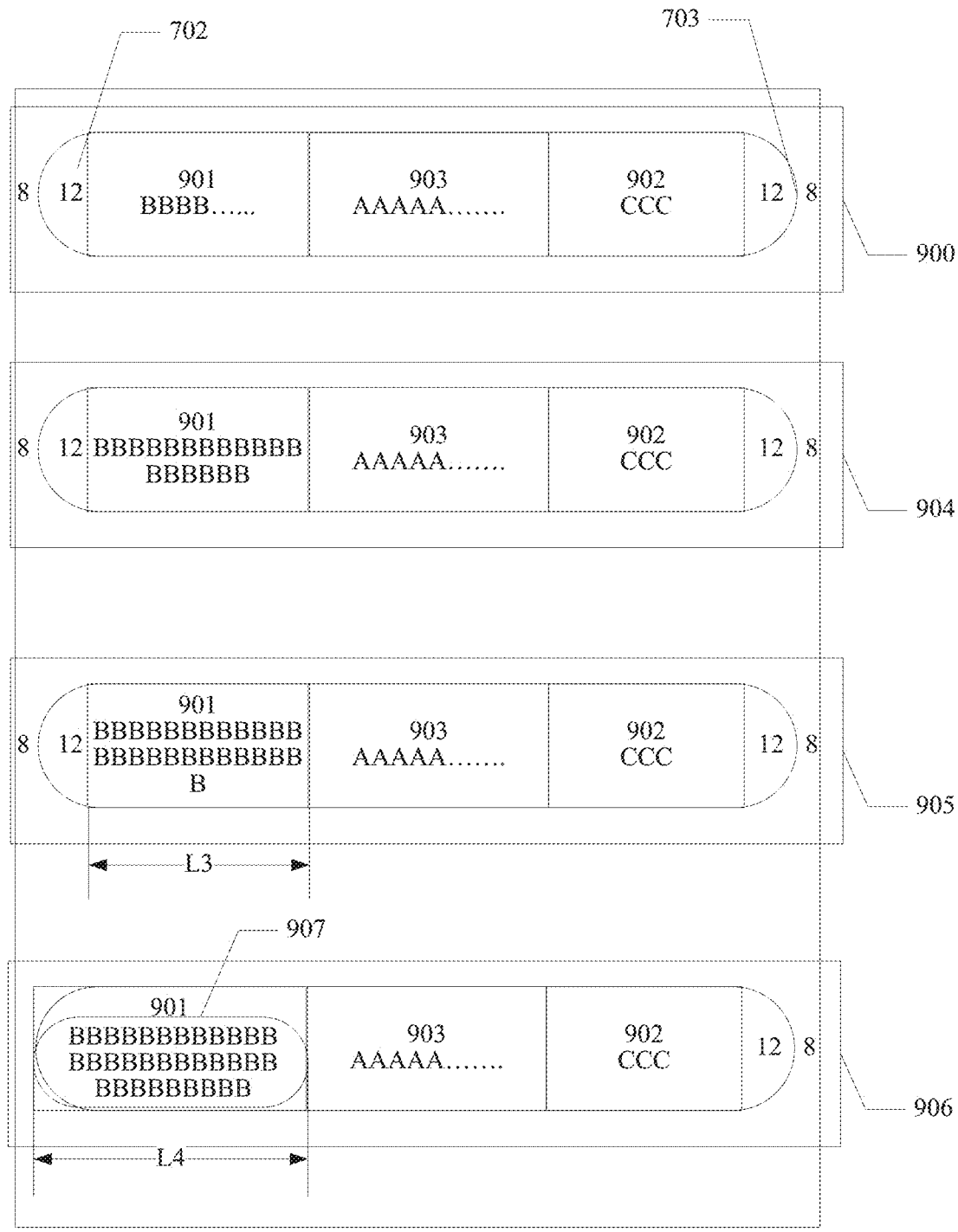
FIG. 9 is a schematic diagram of another embodiment in which a terminal device displays a character string in a control region according to the present invention.

In this embodiment, the third location is at an edge of the sub-region, that is, the reset control region located at the third location is a reset control region located at the edge of the sub-region. For example, as shown in FIG. 9, in a display mode 900, reset control regions located at the third location are a reset control region 901 and a reset control region 902.

It should be further clarified that a quantity of reset control regions between the reset control region 901 and the reset control region 902 is not limited in this embodiment, and this embodiment is described by using an example in which one reset control region 903 is disposed between the reset control region 901 and the reset control region 902.

This case is described by using the reset control region 901 located at the third location as an example, and the reset control region 901 is located at a left edge of the sub-region.

The reset control region 902 located at the third location is located at a right edge of the sub-region. For a manner of displaying a character string in the reset control region 902, refer to a manner of displaying a character string in the reset control region 901, and details are not described in this embodiment again.

In this scenario, because a length of a character string in the reset control region 901 located at the third location and a length of a character string in the reset control region 903 adjacent to the reset control region 901 both are greater than reset lengths of the respective reset control regions, the second preset mode may be as follows.

If a length of a fourth character string on which target processing has been performed is less than or equal to the length of the reset control region located at the third location, the third character string on which the target processing has been performed is displayed in the reset control region in a centered manner.

The fourth character string is a character string in the reset control region located at the third location.

In this setting manner, the target processing is: shrinking any character in the fourth character string in the reset control region located at the third location, so that the shrunk any character in the first character string is greater than or equal to a first preset value.

For a specific description of the first preset value, refer to the foregoing descriptions, and details are not described in this embodiment again.

Still with reference to FIG. 9, when the length of the fourth character string on which the target processing has been performed is less than or equal to a length of the reset control region 901, the display mode in FIG. 9 is switched from the display mode 900 to a display mode 904, and in the display mode 904, the fourth character string in the reset control region 901 is shrunk. When it is ensured that any character in the shrunk fourth character string is greater than or equal to the first preset value, if the length of the fourth character string is less than or equal to the length of the reset control region 901, the fourth character string on which the target processing has been performed is displayed in the reset control region 901 in a centered manner.

If the length of the fourth character string on which the target processing has been performed is greater than the length of the reset control region, the fourth character string on which the target processing has been performed is displayed in the reset control region in a line breaking manner.

Still with reference to FIG. 9, when the length of the fourth character string on which the target processing has been performed is greater than the length of the reset control region 901, the display mode in FIG. 9 is switched from the display mode 900 to a display mode 905, and in the display mode 905, the fourth character string in the reset control region 901 is shrunk. When it is ensured that any character in the shrunk fourth character string is greater than or equal to the first preset value, the shrunk fourth character string is displayed in the reset control region 901 in a line breaking manner.

In this setting manner, a single-line display region of the fourth character string may be further determined, and a length of the single-line display region of the fourth character string is greater than a length of the reset control region located at the third location.

Specifically, the reset control region located at the third location may be extended towards the edge of the display provided that a distance between the single-line display region of the fourth character string and the edge of the display screen of the terminal device is greater than or equal to 0. A specific value is not limited in this embodiment.

Specifically, as can be learned from FIG. 9, in the display mode 900, if a length of a single line of displaying the fourth character string is greater than a length L3 of the reset control region 901, the display mode 900 is switched to a display mode 906, and in the display mode 906, the terminal device determines a single-line display region 907 of the fourth character string.

In this embodiment, a length L2 of the single-line display region 907 of the fourth character string is greater than the length L3 of the reset control region 901.

In this embodiment, if the length of the fourth character string is less than or equal to the length of the single-line display region 907 of the fourth character string, the fourth character string is displayed in the single-line display region 907 of the fourth character string in a single line, or if the length of the fourth character string is greater than the length of the single-line display region 907 of the fourth character string, the fourth character string is displayed in the single-line display region 907 of the fourth character string in a line breaking manner.

Optionally, the fourth character string displayed in the single-line display region 907 of the fourth character string may be a character string on which the target processing has been performed or a character string on which the target processing has not been performed.

As can be learned from this case, because a length of a control region in the prior art is extended, a reset control region in this embodiment can display a longer character string. That is, in this embodiment, line breaking of a character string in the reset control region can be avoided or a quantity of lines of a character string in the reset control region can be reduced, thereby reducing a quantity of times of breaking a character string, and improving efficiency of reading, by a user, a character string.

In another case, the reset control region is located at the third location, the reset control region located at the third location satisfies the first condition, and a reset control region adjacent to the reset control region located at the third location satisfies the second condition.

Figure 10:
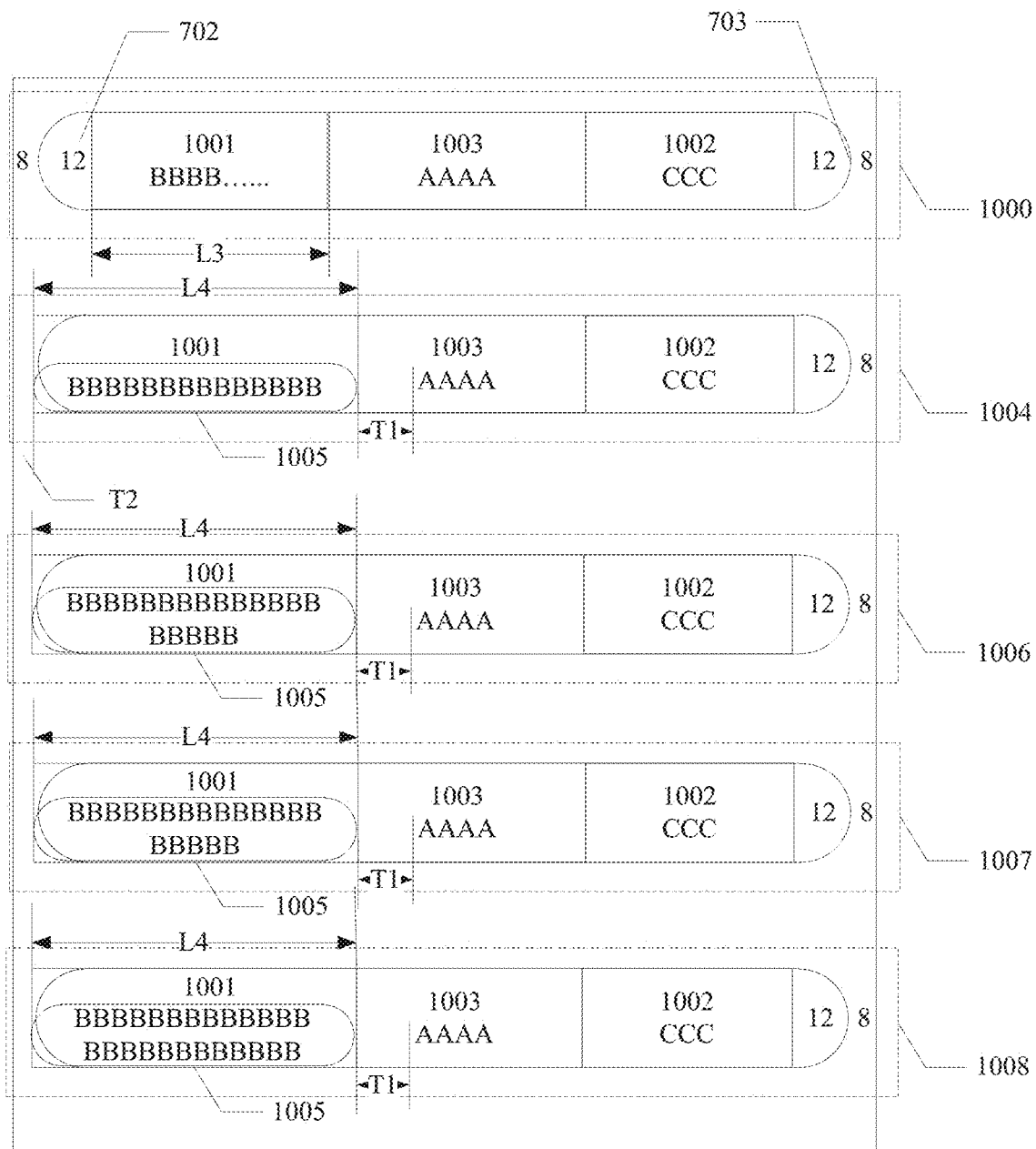
FIG. 10 is a schematic diagram of another embodiment in which a terminal device displays a character string in a control region according to the present invention.

In this embodiment, the third location is at an edge of the sub-region, that is, the reset control region located at the third location is a reset control region located at the edge of the sub-region. For example, as shown in FIG. 10, reset control regions located at the third location are a reset control region 1001 and a reset control region 1002.

This case is described by using the reset control region 1001 located at the third location as an example, and the reset control region 1001 is located at a left edge of the sub-region.

The reset control region 1002 located at the third location is located at a right edge of the sub-region. For a manner of displaying a character string in the reset control region 1002, refer to a manner of displaying a character string in the reset control region 1001, and details are not described in this embodiment again.

It should be further clarified that a quantity of reset control regions between the reset control region 1001 and the reset control region 1002 is not limited in this embodiment, and this embodiment is described by using an example in which one reset control region 1003 is disposed between the reset control region 1001 and the reset control region 1002.

This case is described by using the reset control region 1001 located at the third location as an example, and the reset control region 1001 is located at the left edge of the sub-region.

The reset control region 1002 located at the third location is located at the right edge of the sub-region. For a manner of displaying a character string in the reset control region 1002, refer to a manner of displaying a character string in the reset control region 1001, and details are not described in this embodiment again.

In this scenario, for example, a length of a fourth character string in the reset control region 1001 located at the third location is greater than a reset length of the reset control region 1001, and a length of a fifth character string in the reset control region 1003 located at the fourth location is less than a reset length of the reset control region 1003. The fourth location is a location adjacent to the third location.

In this case, the second preset mode may be:

the fourth character string is displayed in a manner of at least one line of character string, a distance between any line of the at least one line of character string and the fifth character string is greater than or equal to the second preset value, and a distance between any line of the at least one line of character string and the edge of the display screen is greater than or equal to a third preset value.

Specifically, in a display mode 1000 shown in FIG. 10, the fourth character string in the control region 1001 located at the third location cannot be displayed in the reset control region 1001 entirely, that is, a length of a single line of displaying the fourth character string is greater than a length L3 of the reset control region 1001.

A single-line display region of the fourth character string is determined. A length of the single-line display region of the fourth character string is greater than a length of the reset control region located at the third location, a distance between the single-line display region of the fourth character string and the fifth character string is greater than or equal to the second preset value, and/or a distance between the single-line display region of the fourth character string and the edge of the display is greater than or equal to the second preset value.

Specifically, as can be learned from FIG. 10, in the display mode 1000, if the length of the single line of displaying the fourth character string is greater than the length L3 of the reset control region 1001, the display mode 1000 is switched to a display mode 1004, and in the display mode 1004, the terminal device determines a single-line display region 1005 of the fourth character string.

The single-line display region 1005 of the fourth character string is formed by extending two ends of the reset control region 1001 located at the third location respectively towards the edge of the display screen and the fifth character string, or the single-line display region 1005 of the fourth character string is formed by extending the reset control region 1001 located at the third location towards the fifth character string, or the single-line display region 1005 of the fourth character string is formed by extending the reset control region 1001 located at the third location towards the edge of the display screen.

An extension direction of the single-line display region 1005 of the fourth character string is not limited in this embodiment, and this embodiment is described by using an example in which the single-line display region 1005 of the fourth character string is formed by extending the two ends of the reset control region 1001 respectively towards the edge of the display screen and the fifth character string.

As shown in FIG. 10, a length L4 of the single-line display region 1005 of the fourth character string is greater than L3, a distance between the single-line display region 1005 of the fourth character string and the fifth character string in the reset control region 1003 is greater than or equal to the second preset value T1, and a distance between the single-line display region 1005 of the fourth character string and the edge of the display screen is greater than or equal to the third preset value T2.

In this embodiment, the distance between the single-line display region 1005 of the fourth character string and the edge of the display screen is greater than or equal to the third preset value, and the third preset value may be any value greater than or equal to 0.

As can be learned, in this embodiment, the fourth character string can separately move in the reset control region 1001 towards the fifth character string and the edge of the display screen after center alignment.

In this embodiment, a specific process of extending the single-line display region 1005 of the fourth character string may be as follows.

In this embodiment, distances by which the single-line display region 1005 of the fourth character string is separately extended towards two sides may be the same or may be different.

Specifically, in the process of extending the single-line display region 1005 of the fourth character string evenly towards the two sides, if the length of the single-line display region 1005 of the fourth character string is greater than or equal to the length of the single line of displaying the fourth character string, the single-line display region 1005 of the fourth character string is no longer extended towards the two sides.

In the process of extending the single-line display region 1005 of the fourth character string towards the fifth character string and the edge of the display screen, if the distance between the single-line display region 1005 of the fourth character string and the fifth character string is equal to the second preset value, the distance between the single-line display region 1005 of the fourth character string and the edge of the display screen is greater than the third preset value, the single-line display region 1005 of the fourth character string is no longer extended towards the fifth character string, but is extended towards the edge of the display screen until the length of the single-line display region 1005 of the fourth character string is greater than or equal to the length of the single line of displaying the fifth character string and/or the distance between the single-line display region 1005 of the fourth character string and the edge of the display screen is equal to the third preset value.

In the process of extending the single-line display region 1005 of the fourth character string towards the fifth character string and the edge of the display screen, if the distance between the single-line display region 1005 of the fourth character string and the edge of the display screen is equal to the third preset value, and the distance between the single-line display region 1005 of the fourth character string and the fifth character string is greater than the second preset value, the single-line display region 1005 of the fourth character string is no longer extended towards the edge of the display screen, but is extended towards the fifth character string until the length of the single-line display region 1005 of the fourth character string is greater than or equal to the length of the single line of displaying the fifth character string and/or the distance between the single-line display region 1005 of the fourth character string and the fifth character string is equal to the second preset value.

A specific process of displaying the fourth character string in this embodiment is as follows.

Whether the length of the fourth character string is less than or equal to the length of the single-line display region of the fourth character string is determined.

If the length of the fourth character string is less than or equal to the length of the single-line display region of the fourth character string, the fourth character string is displayed in the single-line display region of the fourth character string in a manner of a single line.

Specifically, in the display mode 1004 shown in FIG. 10, if the length of the fourth character string is less than or equal to the length IA of the single-line display region 1005 of the fourth character string, the fourth character string may be displayed in the single-line display region 1005 of the first character string in a manner of a single line.

If the length of the fourth character string is greater than the length of the single-line display region of the fourth character string, optionally, one manner may be: displaying the fourth character string in the single-line display region of the fourth character string in a line breaking manner.

Specifically, in a display mode 1006 shown in FIG. 10, if the length of the fourth character string is greater than the length L4 of the single-line display region 1005 of the fourth character string, the fourth character string may be displayed in the single-line display region 1005 of the fourth character string in at least two lines, so that a length of any line of the fourth character string is less than or equal to the determined length L4 of the single-line display region 1005 of the fourth character string, and a distance between any line of the fourth character string and the fifth character string is greater than or equal to the second preset value.

If the length of the fourth character string is greater than the length of the single-line display region of the fourth character string, further optionally, another manner is: performing target processing on the fourth character string, and if a length of the fourth character string on which the target processing has been performed is less than or equal to the length of the single-line display region of the fourth character string, displaying, in the single-line display region of the fourth character string in a manner of a single line, the fourth character string on which the target processing has been performed, or if a length of the fourth character string on which the target processing has been performed is greater than the length of the single-line display region of the fourth character string, displaying, in the single-line display region of the fourth character string in a line breaking manner, the fourth character string on which the target processing has been performed.

Specifically, in a display mode 1007 shown in FIG. 10, if the length of the fourth character string is greater than the length L4 of the single-line display region 1005 of the fourth character string, the target processing may be performed on the fourth character string. For a specific process of the target processing, refer to the foregoing descriptions, and details are not described again. If a length of the shrunk fourth character string is less than or equal to the length of the single-line display region 1005 of the fourth character string, the fourth character string on which the target processing has been performed is displayed in the single-line display region 1005 of the fourth character string in a single line. In a display mode 1008 shown in FIG. 10, if the length of the fourth character string is greater than the length L4 of the single-line display region 1005 of the fourth character string, the target processing may be performed on the fourth character string, and if a length of the shrunk fourth character string is greater than the length of the single-line display region 1005 of the fourth character string, the fourth character string on which the target processing has been performed is displayed in the single-line display region 1005 of the fourth character string in a line breaking manner.

In this embodiment, the length of the fifth character string is less than a reset length of a reset control region in which the fifth character string is located, so that even though the fourth character string is extended towards the fifth character string, the fifth character string can be displayed in a single line without being broken in the reset control region satisfying the second condition.

In this embodiment, the fourth character string can be further extended towards the edge of the display screen, to increase as much as possible the length of the single line of displaying the fourth character string, and further avoid or reduce a quantity of lines of the fourth character string.

In this embodiment, for a specific manner of displaying the fourth character string and the fifth character string, refer to the foregoing descriptions, and details are not described again.

In this embodiment, even though the fourth character string is controlled to be extended towards the fifth character string and the edge of the display screen, it needs to be ensured that a distance between the fourth character string and the fifth character string is greater than or equal to the second preset value, and the distance between the fourth character string and the fifth character string is greater than or equal to the second preset value, so that it can be effectively avoided that the user mixes the fourth character string up with the fifth character string in a reading process, and the user can clearly know that the fourth character string and the fifth character string respectively are character strings in different reset control regions, thereby avoiding misunderstanding of the user in the reading process, and improving accuracy in the reading process of the user.

The following describes how the method in this embodiment is applied to a specific application scenario.

Figure 11:
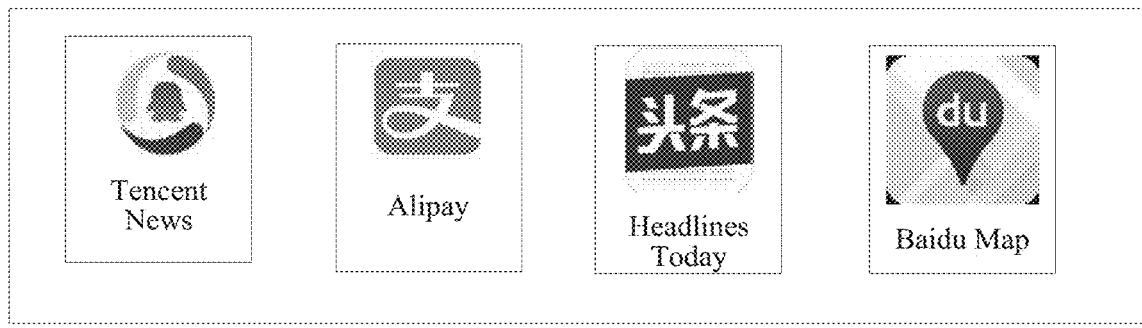
FIG. 11 is a diagram of an example in which a home screen of a terminal device is in a Chinese operating environment according to the present invention.
Figure 12:
FIG. 12 is a diagram of an example in which a home screen of a terminal device is in a Russian operating environment according to the present invention.
Figure 13:
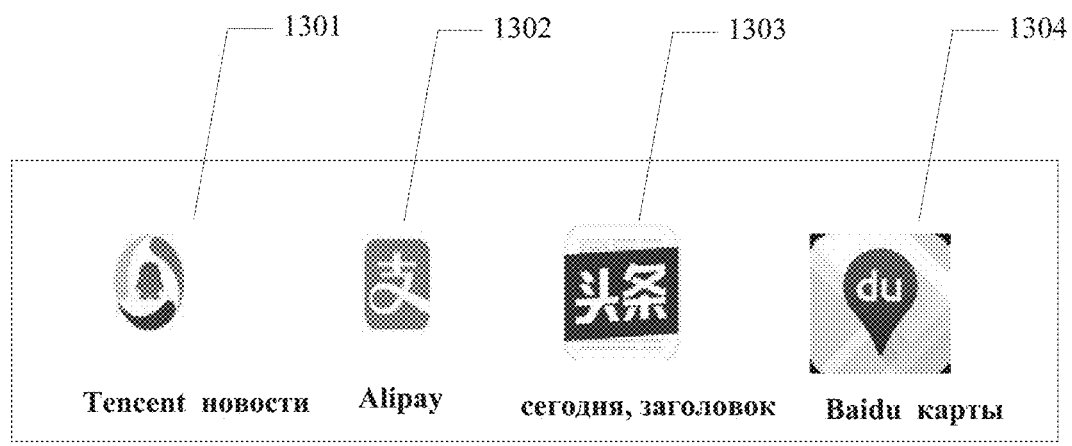
FIG. 13 is a diagram of an example in which a home screen of a terminal device is in a Russian operating environment according to the present invention.

In an application scenario, as shown in FIG. 11, FIG. 12, and FIG. 13, FIG. 11 is a diagram of an example in which a home screen of a terminal device is in a Chinese operating environment, FIG. 12 is a diagram of an example in which a home screen of a terminal device is in a Russian operating environment, and FIG. 13 is a diagram of an example in which a home screen of a terminal device using the method in this embodiment is in a Russian operating environment.

FIG. 11 shows an example in which a sub-region is displayed on a display screen of the terminal device. For descriptions of a specific structure of the sub-region, refer to FIG. 3, and details are not described in this application scenario.

It should be clarified that this application scenario is described by using an example in which an application in a terminal device in a Chinese operating environment is applied to a Russian operating environment, and is not limited.

It should be further clarified that for better understanding of this application scenario, in FIG. 11 to FIG. 13, boundaries of control regions and reset control regions are displayed, and in specific application, the boundaries of the control regions and the reset control regions are not displayed, that is, the boundaries of the control regions and the reset control regions are invisible.

In this application scenario, icons are displayed in control regions displayed on the home screen of the display screen of the terminal device, and names corresponding to the icons are displayed right below the icons in a centered manner.

When the applications in the terminal device in FIG. 11 are applied to the Russian operating environment, the names corresponding to the icons in the control regions are translated into Russian, as shown in FIG. 12.

As can be learned from FIG. 11 and FIG. 12, in different operating environments, display manners for the control regions are different. Specifically, in the Chinese operating environment, as shown in FIG. 11, character strings in the control regions are not displayed in a line breaking manner, and a user conveniently understands the names corresponding to the icons in the control regions. In addition, because the character strings are not displayed in a line breaking manner, efficiency of understanding, by the user, meanings of the character strings in the control regions is improved. However, when the applications in the terminal device in FIG. 11 are applied to the Russian operating environment, character strings in most control regions need to be displayed in a line breaking manner. For example, in a control region 1201, a Chinese character string "Tencent News" is translated into Russian "Tencent новости". As can be learned, a length of the Russian character string is greater than a length of the control region 1201, and the Russian character string needs to be displayed in a line breaking manner. Because the character string is broken, efficiency of understanding, by the user, a meaning of the character string is reduced.

In this application scenario, the applications in the terminal device in FIG. 11 are applied to the Russian operating environment. The terminal device can automatically reset the sub-region, that is, reset the control regions included in the sub-region to reset control regions. For a specific process of resetting the control regions to the reset control regions, refer to step 303 in FIG. 3, and details are not described in this application scenario again.

As can be learned, in this application scenario, a gap between any two neighboring reset control regions is deleted, so as to increase a length of a region used for displaying a character string in each reset control region.

For a specific display manner for a reset control region 1301 in FIG. 13, refer to the display manner of the fourth character string in the reset control region 1001 in FIG. 10, and details are not described in this application scenario again. For a specific display manner for a reset control region 1302 in FIG. 13, refer to the display manner of the fifth character string in the reset control region 1003 in FIG. 10, and details are not described in this application scenario again. For a specific display manner for a reset control region 1303 in FIG. 13, refer to the display manner of the first character string in the reset control region 605 in FIG. 7, and details are not described in this application scenario again. For a specific display manner for a reset control region 1304 in FIG. 13, refer to FIG. 10, and details are not described in this application scenario again.

Figure 14:
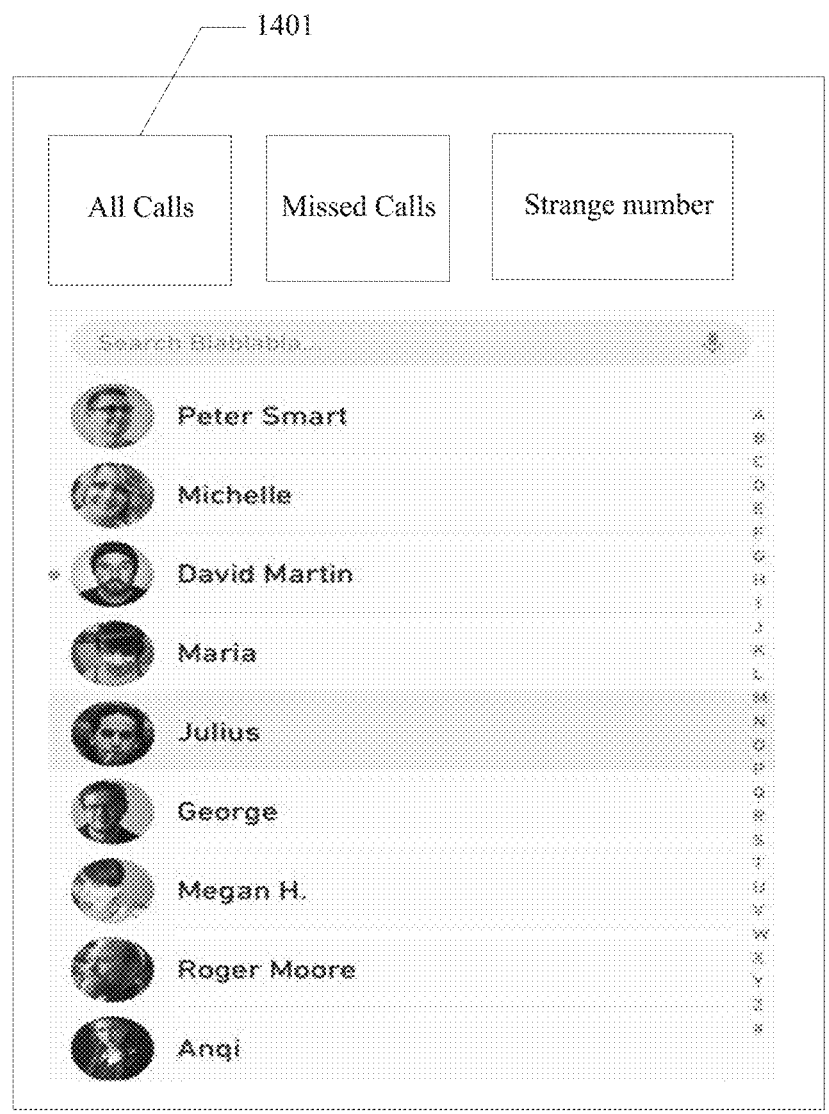
FIG. 14 is a diagram of an example in which a contact application in a terminal device is in an English operating environment according to the present invention.
Figure 15:
FIG. 15 is a diagram of an example in which a contact application in a terminal device is in a Portuguese operating environment according to the present invention.
Figure 16:
FIG. 16 is a diagram of an example in which a contact application in a terminal device is in a Portuguese operating environment according to the present invention.

In another application scenario, as shown in FIG. 14, FIG. 15, and FIG. 16, FIG. 14 is a diagram of an example in which a contact application in a terminal device is in an English operating environment, FIG. 15 is a diagram of an example in which a contact application in a terminal device is in a Portuguese operating environment, and FIG. 16 is a diagram of an example in which a contact application in a terminal device using the method in this embodiment is in a Portuguese operating environment.

It should be clarified that this application scenario is described by using an example in which an application in the terminal device in the English operating environment is applied to the Portuguese operating environment, and is not limited.

It should be further clarified that for better understanding of this application scenario, in FIG. 14 to FIG. 16, boundaries of control regions and reset control regions are displayed, and in specific application, the boundaries of the control regions and the reset control regions are not displayed, that is, the boundaries of the control regions and the reset control regions are invisible.

In this application scenario, only character strings are displayed in control regions in the contact application.

When the application in the terminal device in FIG. 14 is applied to the Portuguese operating environment, a character string in each control region is translated into Portuguese, as shown in FIG. 15.

As can be learned from FIG. 14 and FIG. 15, in different operating environments, display manners for the control regions are different. Specifically, in the English operating environment, as shown in FIG. 14, the character strings in the control regions are not displayed in a line breaking manner, and a user conveniently understands instructions represented by the character strings in the control regions. In addition, because the character strings are not displayed in a line breaking manner, efficiency of understanding, by the user, meanings of the character strings in the control regions is improved. However, when the application in the terminal device in FIG. 14 is applied to the Portuguese operating environment, character strings in most control regions need to be displayed in a line breaking manner. For example, in a control region 1401, an English character string "All Calls" is translated into Portuguese "De todas as chamadas". As can be learned, a length of the Portuguese character string is greater than a length of the control region 1401, and the Portuguese character string needs to be displayed in a line breaking manner. Because the character string is broken, efficiency of understanding, by the user, a meaning of the character string is reduced.

In this application scenario, the application in the terminal device in FIG. 14 is applied to the Portuguese operating environment. The terminal device can automatically reset the sub-region, that is, reset the control regions included in the sub-region to reset control regions. For a specific process of resetting the control regions to the reset control regions, refer to step 303 in FIG. 3, and details are not described in this application scenario again.

As can be learned, in this application scenario, a gap between any two neighboring reset control regions is deleted, so as to increase a length of a region used for displaying a character string in each reset control region.

For a specific display manner for a reset control region 1601 in FIG. 16, refer to the display manner of the fourth character string in the reset control region 1001 in FIG. 10, and details are not described in this application scenario again. For a specific display manner for a reset control region 1602 in FIG. 16, refer to the display manner of the first character string in the reset control region 605 in FIG. 8, and details are not described in this application scenario again. For a specific display manner for a reset control region 1603 in FIG. 16, refer to FIG. 10, and details are not described in this application scenario again.

Figure 17:
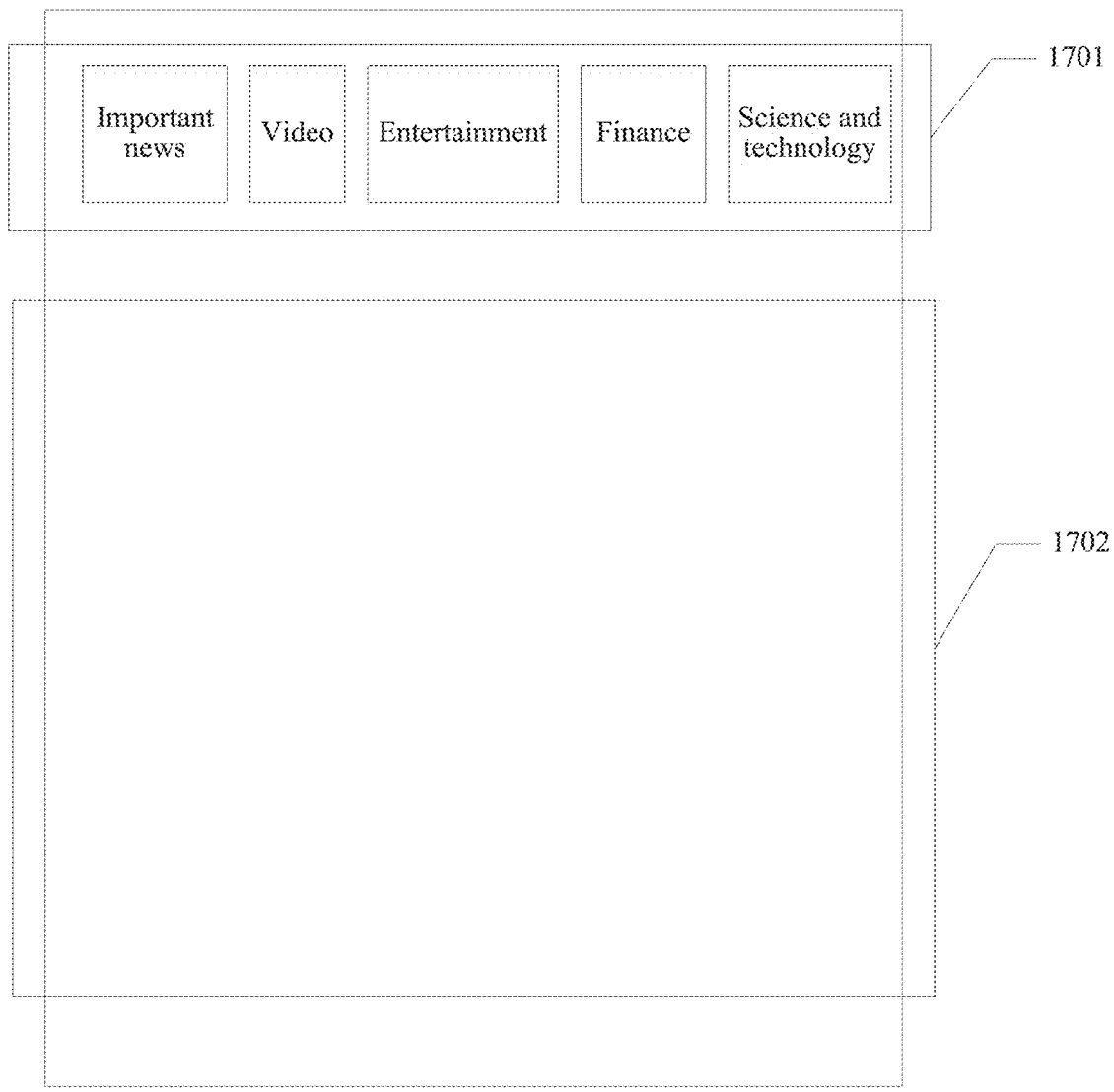
FIG. 17 is a diagram of an example in which a news application in a terminal device is in a Chinese operating environment according to the present invention.
Figure 18:
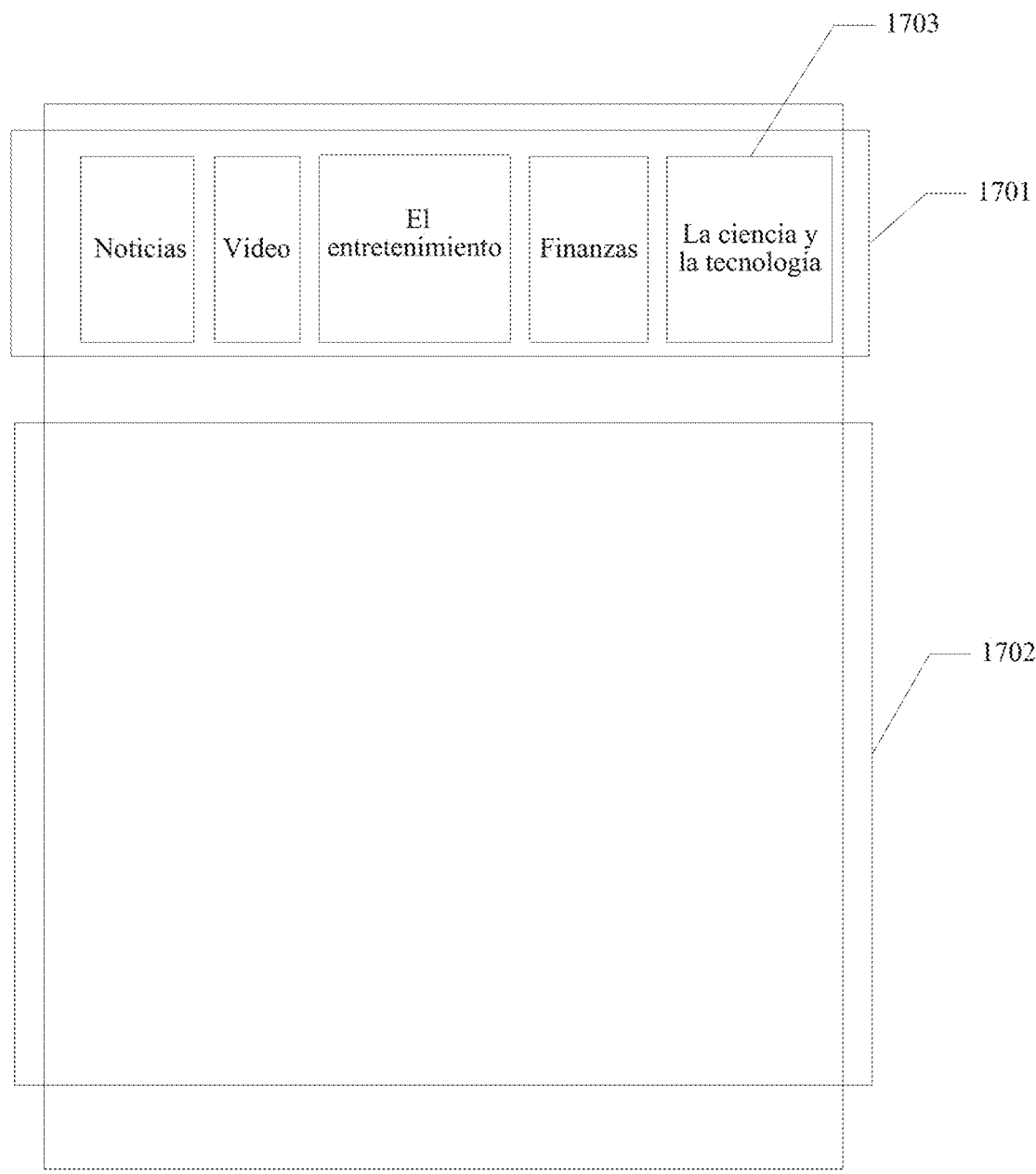
FIG. 18 is a diagram of an example in which a news application in a terminal device is in a Spanish operating environment according to the present invention.
Figure 19:
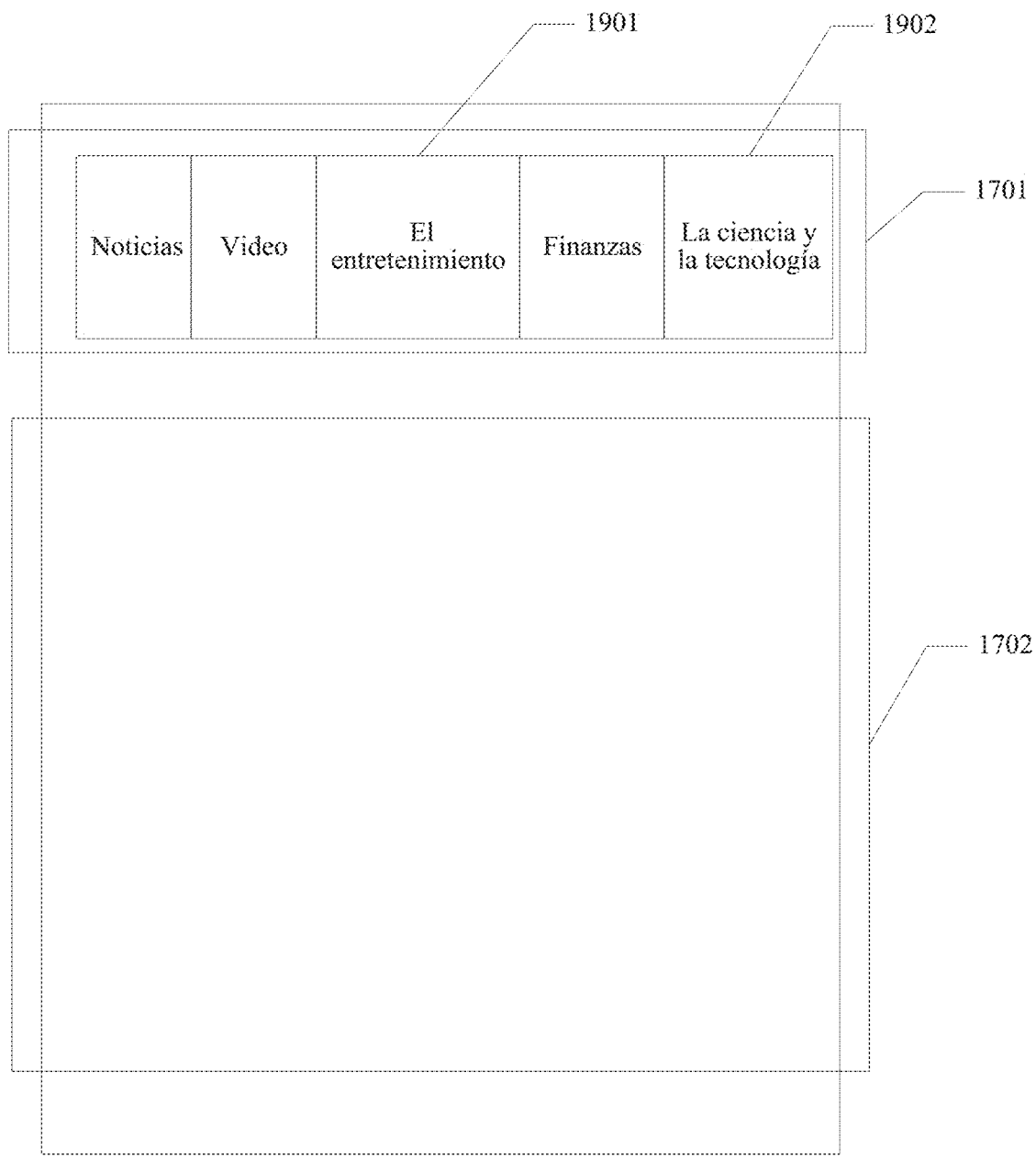
FIG. 19 is a diagram of an example in which a news application in a terminal device is applied to a Spanish operating environment according to the present invention.

In another application scenario, as shown in FIG. 17, FIG. 18, and FIG. 19, FIG. 17 is a diagram of an example in which a news application in a terminal device is in a Chinese operating environment. FIG. 18 is a diagram of an example in which a news application in a terminal device is in a Spanish operating environment, and FIG. 19 is a diagram of an example in which a news application in a terminal device using the method in this embodiment is applied to a Spanish operating environment.

In this embodiment, for example, the news application is Tencent News. It should be clarified that this embodiment is merely described by using the news application as an example, and in specific application, the method may be applied to an interface of any application.

It should be clarified that this application scenario is described by using an example in which an application in the terminal device in the Chinese operating environment is applied to the Spanish operating environment, and is not limited.

It should be further clarified that for better understanding of this application scenario, in FIG. 17 to FIG. 19, boundaries of control regions and reset control regions are displayed, and in specific application, the boundaries of the control regions and the reset control regions are not displayed, that is, the boundaries of the control regions and the reset control regions are invisible.

In this application scenario, only character strings are displayed in control regions in the news application.

When the application in the terminal device in FIG. 17 is applied to the Spanish operating environment, a character string in each control region is translated into Spanish, as shown in FIG. 18.

As shown in FIG. 17, a display interface of the news application includes a navigation bar 1701 used for news navigation. A plurality of control regions are displayed on the navigation bar, and a character string displayed in each control region is used for navigating a particular type of news. For example, if a user touches a character string in a control region "Entertainment", a news display bar 1702 can display news corresponding to the type "Entertainment".

As can be learned from FIG. 17 and FIG. 18, in different operating environments, display manners for the control regions are different. Specifically, in the Chinese operating environment, as shown in FIG. 17, the character strings in the control regions are not displayed in a line breaking manner, and a user conveniently understands instructions represented by the character strings in the control regions. In addition, because the character strings are not displayed in a line breaking manner, efficiency of understanding, by the user, meanings of the character strings in the control regions is improved. However, when the application in the terminal device in FIG. 17 is applied to the Spanish operating environment, character strings in most control regions need to be displayed in a line breaking manner. For example, in a control region 1702, a Chinese character string "Science and technology" is translated into Spanish "La ciencia y la tecnologia". As can be learned, a length of the Spanish character string is greater than a length of the control region 1703, and the Spanish character string needs to be displayed in a line breaking manner. Because the character string is broken, efficiency of understanding, by the user, a meaning of the character string is reduced.

In this application scenario, the application in the terminal device in FIG. 17 is applied to the Spanish operating environment. The terminal device can automatically reset the sub-region, that is, reset the control regions included in the sub-region to reset control regions. For a specific process of resetting the control regions to the reset control regions, refer to step 303 in FIG. 3, and details are not described in this application scenario again.

As can be learned, in this application scenario, a gap between any two neighboring reset control regions is deleted, so as to increase a length of a region used for displaying a character string in each reset control region.

For a specific display manner for a reset control region 1901 in FIG. 19, refer to the display manner of the first character string in the reset control region 605 in FIG. 8, and details are not described in this application scenario again. For a specific display manner for a reset control region 1902 in FIG. 19, refer to FIG. 10, and details are not described in this application scenario again.

As can be learned, in the method in this embodiment, a display area of a control region can be reset to form a reset control region, and a length of the reset control region is greater than a length of the control region, so that a length of a region for displaying a character string can be increased. In addition, if a length of a character string in the reset control region is greater than a length of the reset control region, the character string can be extended towards at least one side, and/or the character string can be shrunk, so that line breaking of the character string in the reset control region can be avoided or a quantity of lines of the character string in the reset control region can be reduced, thereby reducing a quantity of times of breaking the character string, and improving efficiency of reading, by a user, the character string.

Figure 23:
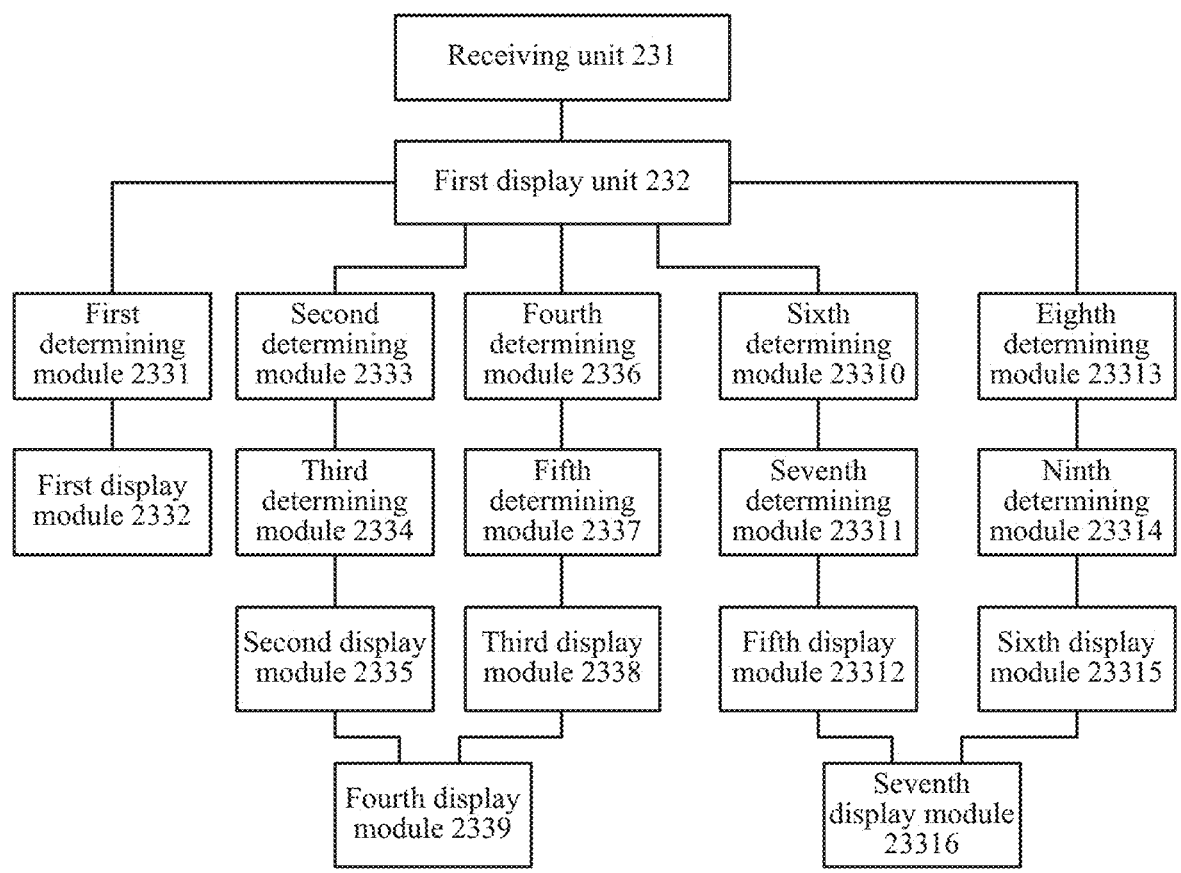
FIG. 23 is a schematic structural diagram of another embodiment of a terminal device according to the present invention.

The following describes a specific structure of a terminal device according to an embodiment of the present invention with reference to FIG. 23. The terminal device in this embodiment is configured to perform the method in FIG. 3. For a specific process of performing, by the terminal device in FIG. 23, the character string display method, refer to FIG. 3, and details are not described in this embodiment again.

The terminal device includes:

a receiving unit 231, configured to receive control information, where the control information is used to instruct the terminal device to process at least two control regions, to form at least two reset control regions satisfying a first target condition, a first gap is disposed between any two neighboring control regions in the at least two control regions in a landscape direction of a display screen, and the first target condition is: any two neighboring reset control regions in the at least two reset control regions in the landscape direction of the display screen are connected:

a first display unit 232, configured to display the at least two reset control regions on the display screen based on the control information; and a second display unit 233, configured to display a character string in any one of the at least two reset control regions.

Specifically, the second display unit 233 includes:

a first determining module 2331, configured to determine at least one first target reset control region included in the at least two reset control regions, where a second target reset control region is disposed on each of two sides of the first target reset control region, a length of a first character string included in the first target reset control region is greater than a length of the first target reset control region, and a length of a second character string included in the second target reset control region is greater than a length of the second target reset control region; and a first display module 2332, configured to display, in the first target reset control region in a display manner of at least one line of character string, the first character string on which target processing has been performed, so that any line of the at least one line of character string of the first character string satisfies a second target condition, where the target processing is: shrinking a character string, and enabling the shrunk character string to be greater than or equal to a first preset value; and the second target condition is: a length of any line of the at least one line of character string of the first character string on which the target processing has been performed is less than or equal to a reset length of the first target reset control region, and a gap between any line of the at least one line of character string of the first character string and the second character string is greater than or equal to a second preset value.

Specifically, the second display unit 233 includes:

a second determining module 2333, configured to determine at least one first target reset control region included in the at least two reset control regions, where a length of a first character string included in the first target reset control region is greater than a length of the first target reset control region, a length of a second character string in a second target reset control region located on a first side of the first target reset control region is less than a second length, the second length is a reset length of the second target reset control region located on the first side of the first target reset control region, a length of a third character string in a second target reset control region located on a second side of the first target reset control region is greater than a third length, and the third length is a reset length of the second target reset control region located on the second side of the first target reset control region;

a third determining module 2334, configured to determine a single-line display region of the first character string, where the single-line display region of the first character string is disposed by extending the first target reset control region towards the second character string, so that a length of the single-line display region of the first character string is greater than a reset length of the first target reset control region, and a gap between the single-line display region of the first character string and the second character string is greater than or equal to a second preset value; and a second display module 2335, configured to display the first character string in the single-line display region of the first character string in a display manner of at least one line of character string, so that a length of any line of the at least one line of character string of the first character string is less than or equal to a reset length of the single-line display region of the first character string.

Specifically, the second display unit 233 includes:

a fourth determining module 2336, configured to determine at least one first target reset control region included in the at least two reset control regions, where a length of a first character string included in the first target reset control region is greater than a length of the first target reset control region, a length of a second character string in a second target reset control region located on a first side of the first target reset control region is less than a second length, the second length is a reset length of the second target reset control region located on the first side of the first target reset control region, a length of a third character string in a second target reset control region located on a second side of the first target reset control region is less than a third length, and the third length is a reset length of the second target reset control region located on the second side of the first target reset control region;

a fifth determining module 2337, configured to determine a single-line display region of the first character string, where the single-line display region of the first character string is disposed by extending the first target reset control region towards the second character string and the third character string, so that a length of the single-line display region of the first character string is greater than a reset length of the first target reset control region, and a gap between the single-line display region of the first character string and the second character string and a gap between the single-line display region of the first character string and the third character string both are greater than or equal to a second preset value; and a third display module 2338, configured to display the first character string in the single-line display region of the first character string in a display manner of at least one line of character string, so that a length of any line of the at least one line of character string of the first character string is less than or equal to the length of the single-line display region of the first character string.

Specifically, the second display unit 233 includes:

a fourth display module 2339, configured to display, in the single-line display region of the first character string in the display manner of at least one line of character string, the first character string on which target processing has been performed, where the target processing is: shrinking a character string, and enabling the shrunk character string to be greater than or equal to a first preset value.

Specifically, the second display unit 233 includes:

a sixth determining module 23310, configured to determine at least one fourth target reset control region included in the at least two reset control regions, where a length of a fourth character string included in the fourth target reset control region is greater than a length of the fourth target reset control region, the fourth target reset control region is located between an edge of the display screen and a fifth target reset control region, and a length of a fifth character string included in the fifth target reset control region is greater than a length of the fifth target reset control region:

a seventh determining module 23311, configured to determine a single-line display region of the fourth character string, where the single-line display region of the fourth character string is disposed by extending the fourth target reset control region towards the edge of the display screen, so that a length of the single-line display region of the fourth character string is greater than a reset length of the fourth target reset control region, and a gap between the single-line display region of the fourth character string and the edge of the display screen is greater than or equal to a third preset value; and a fifth display module 23312, configured to display the fourth character string in the single-line display region of the fourth character string in a display manner of at least one line of character string, so that a length of any line of the at least one line of character string of the fourth character string is less than or equal to the length of the single-line display region of the fourth character string.

Specifically, the second display unit 233 includes:

an eighth determining module 23313, configured to determine at least one fourth target reset control region included in the at least two reset control regions, where a length of a fourth character string included in the fourth target reset control region is greater than a length of the fourth target reset control region, the fourth target reset control region is located between an edge of the display screen and a fifth target reset control region, and a length of a fifth character string included in the fifth target reset control region is less than a length of the fifth target reset control region:

a ninth determining module 23314, configured to determine a single-line display region of the fourth character string, where the single-line display region of the fourth character string is disposed by extending the fourth target reset control region towards the edge of the display screen and the fifth character string, so that a length of the single-line display region of the fourth character string is greater than a reset length of the fourth target reset control region, a gap between the single-line display region of the fourth character string and the edge of the display screen is greater than or equal to a third preset value, and a gap between the fourth character string and the fifth character string is greater than or equal to a second preset value; and a sixth display module 23315, configured to display the fourth character string in the single-line display region of the fourth character string in a display manner of at least one line of character string, so that a length of any line of the at least one line of character string of the fourth character string is less than or equal to the length of the single-line display region of the fourth character string.

Specifically, the second display unit 233 includes:

a seventh display module 23316, configured to display, in the fourth target reset control region in the display manner of at least one line of character string, the fourth character string on which target processing has been performed, so that a length of any line of the at least one line of character string of the fourth character string is less than or equal to the reset length of the fourth target reset control region, where the target processing is: shrinking a character string, and enabling the shrunk character string to be greater than or equal to a first preset value.

In the terminal device provided in this embodiment of the present invention, the terminal device can process at least two control regions based on the control information, to form at least two reset control regions satisfying the first target condition, where the first target condition is: any two neighboring reset control regions in the at least two reset control regions in the landscape direction of the display screen are connected; and display a character string in any one of the at least two reset control regions. In the terminal device in this embodiment, a length of the reset control region is greater than a length of the control region, and a length of a character string that can be displayed in the reset control region is greater than a length of a character string that can be displayed in the control region, so that a quantity of lines of a character string displayed in a reset control region can be reduced effectively, and efficiency of reading, by a user, a character string displayed in a reset control region is improved.

FIG. 23 describes a structure of the terminal device from the perspective of functional modules, and the following further describes the structure of the terminal device from the perspective of entity hardware with reference to FIG. 1.

The terminal device includes one or more processors 203, a memory 204, a bus system, and one or more programs, where the processor 203 and the memory 204 are connected by using the bus system.

The one or more programs are stored in the memory 204, the one or more programs include an instruction, and when the instruction is executed by the terminal device, the terminal device performs the character string display method in FIG. 3.

For a specific process of performing, by the terminal device in this embodiment, the character string display method, refer to FIG. 3, and details are not described in this embodiment again.

For a specific structure of the terminal device in this embodiment, refer to the foregoing embodiment, and details are not described in this embodiment again.

Specifically, in this embodiment, the one or more programs include an instruction. When the instruction is executed by the terminal device, the terminal device performs the character string display method in FIG. 3. For a specific process in which the instruction performs the character string display method, refer to FIG. 3, and details are not described in this embodiment again.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A terminal device, comprising:
a memory configured to store one or more programs, wherein the one or more programs comprise instructions; and
a processor coupled to the memory, wherein the instructions, when executed by the processor, cause the terminal device to:
display a first interface element, wherein the first interface element comprises a first character string and has a first width, wherein the first character string has a first font size, and wherein the first character string is displayed in a first language;
display a second interface element, wherein the second interface element is displayed adjacent to and separated from the first interface element such that a gap exists between the first interface element and the second interface element, wherein the second interface element comprises a second character string and has a second width, wherein the second character string has a second font size, and wherein the second character string is displayed in the first language;
detect a user input that changes the first language to a second language and results in an increase in a number of characters in the first character string;
change the first interface element from the first width to a third width when detecting the user input that changes the first language to the second language and results in the increase in the number of characters in the first character string, wherein the third width is different from the first width in that the third width comprises a greater horizontal distance than the first width, and wherein the gap between the first interface element and the second interface element is eliminated when the first width is changed to the third width; and
display the first character string and the second character string in a second language when detecting the user input.

2. The terminal device of claim 1, wherein each of the first character string and the second character string is displayed in a center manner.

3. The terminal device of claim 1, wherein the first character string has a third font size when displayed in the second language, and wherein the third font size is different from the first font size.

4. The terminal device of claim 3, wherein the second character string has a fourth font size when displayed in the second language, and wherein the fourth font size is different from the second font size.

5. The terminal device of claim 3, wherein the second font size is different from the first font size.

6. The terminal device of claim 3, wherein the second font size is the same as the first font size.

7. The terminal device of claim 1, wherein the second interface element has a fourth width when the second character string is displayed in the second language, and wherein the fourth width is different from the second width.

8. The terminal device of claim 7, wherein the third width is greater than the first width, and wherein the fourth width is less than the second width.

9. The terminal device of claim 1, wherein the first character string is displayed in a single line in the first language and in a plurality of lines in the second language.

10. The terminal device of claim 1, wherein each of the first interface element and the second interface element has an image.

11. A computer-readable storage medium storing one or more programs, wherein the one or more programs comprise instructions, and wherein a terminal device executes the instructions to:
- display a first interface element, wherein the first interface element comprises a first character string and has a first width, wherein the first character string has a first font size, and wherein the first character string is displayed in a first language;
- display a second interface element, wherein the second interface element is displayed adjacent to and separated from the first interface element such that a gap exists between the first interface element and the second interface element, wherein the second interface element comprises a second character string and has a second width, wherein the second character string has a second font size, and wherein the second character string is displayed in the first language;
- detect a user input that changes the first language to a second language and results in an increase in a number of characters in the first character string;
- change the first interface element from the first width to a third width when detecting the user input that changes the first language to the second language and results in the increase in the number of characters in the first character string, wherein the third width is different from the first width in that the third width comprises a greater horizontal distance than the first width, and wherein the gap between the first interface element and the second interface element is eliminated when the first width is changed to the third width; and
- display the first character string and the second character string in a second language when detecting the user input.

12. The computer-readable storage medium of claim 11, wherein each of the first character string and the second character string is displayed in a center manner.

13. The computer-readable storage medium of claim 11, wherein the first character string has a third font size when displayed in the second language, and wherein the third font size is different from the first font size.

14. The computer-readable storage medium of claim 13, wherein the second character string has a fourth font size when displayed in the second language, and wherein the fourth font size is different from the second font size.

15. The computer-readable storage medium of claim 13, wherein the second font size is different from the first font size.

16. The computer-readable storage medium of claim 13, wherein the second font size is the same as the first font size.

17. The computer-readable storage medium of claim 11, wherein the second interface element has a fourth width when the second character string is displayed in the second language, and wherein the fourth width is different from the second width.

18. The computer-readable storage medium of claim 17, wherein the third width is greater than the first width, and wherein the fourth width is less than the second width.

19. The computer-readable storage medium of claim 11, wherein the first character string is displayed in a single line in the first language and in a plurality of lines in the second language.

20. The computer-readable storage medium of claim 11, wherein each of the first interface element and the second interface element has an image.

* * * * *